United States Patent
Nathan et al.

(10) Patent No.: US 7,814,702 B2
(45) Date of Patent: *Oct. 19, 2010

(54) RODENT TRAP HAVING A PIVOTING PLATFORM

(75) Inventors: Philip Nathan, West Hartford, CT (US);
Matthew L. Phillips, Litchfield, CT (US); Lynn Briggs, Bristol, CT (US);
Thomas Paul Danniger, Ostrander, OH (US); Richard Gene Foster, Powell, OH (US)

(73) Assignee: SMG Brands, Inc., Wilmington, DE (US)

( * ) Notice: Subject to any disclaimer, the term of this patent is extended or adjusted under 35 U.S.C. 154(b) by 10 days.

This patent is subject to a terminal disclaimer.

(21) Appl. No.: 12/139,849

(22) Filed: Jun. 16, 2008

(65) Prior Publication Data

US 2009/0151224 A1    Jun. 18, 2009

Related U.S. Application Data

(63) Continuation-in-part of application No. 11/956,929, filed on Dec. 14, 2007.

(51) Int. Cl.
*A01M 23/12* (2006.01)
(52) U.S. Cl. .................................. 43/70; 43/69; 43/72
(58) Field of Classification Search .................... 43/58, 43/69, 70, 71, 72
See application file for complete search history.

(56) References Cited

U.S. PATENT DOCUMENTS

| 83,074 | A | 10/1868 | McClure |
|---|---|---|---|
| 441,677 | A | 12/1890 | Lovell |
| 982,486 | A | 1/1911 | Edwards |
| 1,281,876 | A | 10/1918 | Taylor |
| D57,320 | S | 3/1921 | Dorsch |
| 1,587,536 | A | 6/1926 | Lobit |
| 1,677,470 | A | 7/1928 | Dorsch et al. |
| 1,747,380 | A * | 2/1930 | McCully ........................ 43/61 |
| 2,160,986 | A * | 6/1939 | Rafferty et al. ................ 43/69 |
| 2,169,783 | A | 8/1939 | Allen |
| 2,510,655 | A | 6/1950 | Price et al. |
| 2,529,589 | A | 11/1950 | Biery |

(Continued)

FOREIGN PATENT DOCUMENTS

EP    0280504    8/1988

(Continued)

OTHER PUBLICATIONS

International Search Reported Dated Jan. 26, 2009 for International Application No. PCT/US08/85683.

(Continued)

*Primary Examiner*—Christopher P Ellis
(74) *Attorney, Agent, or Firm*—Hunton & Williams LLP

(57) ABSTRACT

A trap having a housing and an entrance, a trigger plate pivotally coupled to the housing, and when triggered by an animal, the trigger plate pivots towards the housing to thereby trap the animal against the housing. The trap may further include a biasing element to bias the trigger plate towards the housing. The trap may further include blunt fingers extending from the back wall. When the trap is triggered, an animal may be trapped between the trigger plate and the blunt fingers.

22 Claims, 32 Drawing Sheets

U.S. PATENT DOCUMENTS

| | | | |
|---|---|---|---|
| 4,030,230 | A | 6/1977 | Souza |
| 4,144,667 | A | 3/1979 | Souza |
| 4,245,423 | A | 1/1981 | Souza et al. |
| 4,253,264 | A | 3/1981 | Souza |
| 4,578,893 | A | 4/1986 | Wickenberg |
| 4,685,245 | A * | 8/1987 | LaPier ............................ 43/78 |
| 4,769,942 | A | 9/1988 | Copenhaver, Sr. |
| 4,803,799 | A | 2/1989 | Vajs et al. |
| D300,163 | S | 3/1989 | Landell et al. |
| 4,852,294 | A | 8/1989 | Langli |
| 4,856,225 | A | 8/1989 | Radesky et al. |
| 4,858,373 | A | 8/1989 | Combs |
| 4,926,581 | A | 5/1990 | Grivas |
| 5,040,327 | A | 8/1991 | Stack et al. |
| 5,044,113 | A | 9/1991 | Stack et al. |
| 5,107,619 | A | 4/1992 | Zapata et al. |
| 5,148,624 | A | 9/1992 | Schmidt |
| 5,172,512 | A | 12/1992 | Bodker et al. |
| D346,199 | S | 4/1994 | Spragins et al. |
| 5,337,512 | A | 8/1994 | Krenzler |
| 5,384,981 | A | 1/1995 | Cohen |
| 5,398,442 | A | 3/1995 | Musket |
| 5,448,852 | A | 9/1995 | Spragins et al. |
| 5,471,781 | A | 12/1995 | Vine |
| 5,477,636 | A | 12/1995 | Musket |
| 5,481,824 | A | 1/1996 | Fiore, Jr. |
| 5,572,825 | A | 11/1996 | Gehret |
| 5,577,342 | A | 11/1996 | Johnson et al. |
| D385,611 | S | 10/1997 | Prince et al. |
| D386,554 | S | 11/1997 | Brewer |
| 5,692,336 | A | 12/1997 | Fiore, Jr. et al. |
| 5,746,020 | A | 5/1998 | Fiore, Jr. et al. |
| 5,806,237 | A | 9/1998 | Nelson et al. |
| D409,711 | S | 5/1999 | Johnson |
| 5,950,353 | A | 9/1999 | Johnson et al. |
| 6,047,494 | A | 4/2000 | Johnson et al. |
| D441,828 | S | 5/2001 | Leyerle et al. |
| 6,248,730 | B1 | 6/2001 | Poché |
| 6,266,917 | B1 | 7/2001 | Hight |
| 6,389,738 | B1 | 5/2002 | Denny et al. |
| D459,428 | S | 6/2002 | Johnson et al. |
| 6,397,517 | B1 | 6/2002 | Leyerle et al. |
| 6,415,544 | B1 | 7/2002 | Leyerle et al. |
| 6,481,151 | B1 | 11/2002 | Johnson et al. |
| 6,493,988 | B1 | 12/2002 | Johnson |
| 6,508,031 | B1 | 1/2003 | Johnson et al. |
| 6,543,179 | B1 * | 4/2003 | Lee ............................ 43/61 |
| 6,574,912 | B1 | 6/2003 | Johnson |
| 6,594,948 | B1 | 7/2003 | Novack |
| 6,609,328 | B2 | 8/2003 | Swift et al. |
| 6,622,422 | B2 | 9/2003 | Gehret et al. |
| 6,631,582 | B2 | 10/2003 | Knuppel et al. |
| D485,597 | S | 1/2004 | Turner |
| 6,684,560 | B2 | 2/2004 | Lafforthun |
| 6,691,452 | B1 | 2/2004 | Knuppel et al. |
| 6,694,669 | B2 | 2/2004 | Gehret et al. |
| 6,735,899 | B1 | 5/2004 | Anderson et al. |
| 6,775,947 | B2 | 8/2004 | Anderson et al. |
| 6,796,081 | B2 | 9/2004 | Anderson et al. |
| 6,807,768 | B2 | 10/2004 | Johnson et al. |
| 6,836,999 | B2 | 1/2005 | Rich et al. |
| 6,938,368 | B2 | 9/2005 | Guidry |
| 6,955,007 | B2 | 10/2005 | Gehret et al. |
| 6,990,766 | B2 | 1/2006 | Gehret et al. |
| D514,655 | S | 2/2006 | Rodgers et al. |
| D515,175 | S | 2/2006 | Mayo et al. |
| 7,010,882 | B2 | 3/2006 | Rich et al. |
| 7,069,688 | B2 | 7/2006 | Hill |
| 7,089,701 | B2 | 8/2006 | Frisch |
| D529,571 | S | 10/2006 | Hoyes |
| 7,171,777 | B2 | 2/2007 | Welin-Berger |
| 7,219,466 | B2 | 5/2007 | Rich et al. |
| 7,231,738 | B2 | 6/2007 | Watson et al. |
| 2003/0215481 | A1 | 11/2003 | Borchert et al. |
| 2004/0025410 | A1 | 2/2004 | Shapland |
| 2004/0088903 | A1 | 5/2004 | Poche |
| 2004/0244274 | A1 | 12/2004 | Dellevigne et al. |
| 2005/0279015 | A1 | 12/2005 | Hall |
| 2006/0032110 | A1 | 2/2006 | Yang |
| 2006/0042153 | A1 | 3/2006 | Bowerman |
| 2006/0053682 | A1 | 3/2006 | Goldstein |
| 2006/0117644 | A1 | 6/2006 | Hoyes et al. |
| 2006/0156615 | A1 | 7/2006 | Hale |
| 2006/0156617 | A1 | 7/2006 | Hale |
| 2006/0265941 | A1 | 11/2006 | Newton |
| 2006/0272197 | A1 | 12/2006 | Wiesener et al. |
| 2007/0017148 | A1 | 1/2007 | Blau |
| 2007/0017149 | A1 | 1/2007 | Rodgers et al. |

FOREIGN PATENT DOCUMENTS

| | | |
|---|---|---|
| EP | 0553336 | 8/1993 |
| EP | 0745323 | 12/1996 |
| EP | 0806138 | 11/1997 |
| EP | 1149530 | 10/2001 |
| GB | 2329125 | 3/1999 |
| GB | 2384966 | 8/2003 |
| JP | 6165630 | 6/1994 |
| WO | WO 02/02147 | 12/2002 |
| WO | WO 03/059057 | 7/2003 |
| WO | WO 2005/022992 | 3/2005 |
| WO | WO 2005/072524 | 8/2005 |

OTHER PUBLICATIONS

International Search Reported Dated Jul. 31, 2009 for International Application No. PCT/US09/47499.

Non-Final Office Action mailed May 20, 2009, U.S. Appl. No. 11/956,929, filed Dec. 14, 2007, Title: "Rodent Trap Having a Pivoting Platform," First Named Inventor: Philip Nathan.

* cited by examiner

RODENT TRAP HAVING A PIVOTING PLATFORM

CROSS-REFERENCE TO RELATED APPLICATION

This application is a continuation-in-part of, claims priority to and incorporates by reference in its entirety U.S. application Ser. No. 11/956,929 filed on Dec. 14, 2007.

FIELD OF THE INVENTION

The present embodiments relate to animal traps in general, and more particularly to rodent traps having a pivoting platform, which when triggered, traps and contains the rodent within the trap.

BACKGROUND INFORMATION

Conventional animal traps are not always self contained. In other words, in conventional traps the trapping mechanism, and therefore the trapped animal, are open to the environment so that they are visible to and accessible from the environment. For example, in conventional rodent traps having a spring loaded wicket trap or "glue trap," the "trapped" rodent is visible. When the rodent is trapped, it is often still alive. Thus making disposal of the trap difficult and uncomfortable for some people. In addition, because these type of traps are not self-contained children and/or pets may accidentally trigger the traps and/or get caught in the trap. For example, a dog may attempt to eat the bait on the spring loaded wicket trap and have the wicket come down on the dog's snout. With respect to glue traps, a child may step on the trap and have a difficult time removing the trap and/or glue. These and other problems exist with conventional traps.

The description herein of certain advantages and disadvantages of known methods and devices is not intended to limit the scope of the present invention. Indeed the present embodiments may include some or all of the features described above without suffering from the same disadvantages.

SUMMARY OF THE INVENTION

In view of the foregoing, one or more embodiments include a trap that securely traps a rodent, such as a mouse, within an enclosure. The enclosure can have limited external accessibility and visibility, thus the trap and rodent can be disposed of without seeing and/or touching the rodent.

At least one embodiment provides a trap having a housing with an entrance that provides a passageway into the housing, a platform pivotally coupled to the housing, and a trigger that, when triggered by a rodent, triggers the platform to trap the rodent against the housing.

At least one embodiment provides a trap having a housing with an entrance that provides a passageway into the housing, a trigger plate pivotally coupled to the housing, and when the trigger plate is triggered by a rodent, the trigger plate pivots trapping the rodent against the housing.

At least one embodiment provides a trap having a housing that has a plurality of walls and at least one entrance providing a passageway into the housing, a platform pivotally coupled to the housing, and a trigger operatively coupled to the platform, the trigger having a latched position in which the platform is adjacent to the entrance and a triggered position in which the platform is biased towards a wall.

At least one embodiment provides a trap having a housing that has a plurality of walls and at least one entrance providing a passageway into the housing, a trigger plate pivotally coupled to the housing, and the trigger plate having a latched position in which the trigger plate is adjacent to the entrance and a triggered position in which the trigger plate is biased towards a wall.

At least one embodiment provides a trap having a housing that has a top, a bottom, a first side wall, a second side wall, a back wall, and an entrance providing a passageway into the housing, at least one numbing finger coupled to the housing with each numbing finger extending laterally towards the entrance, a platform pivotally coupled to the housing and residing above the bottom of the housing and adjacent to the entrance in a set position, a biasing element biasing the platform towards the back wall, and a trigger that, when triggered by a rodent, releases the platform to pivot from the set position towards the rear wall to trapping the rodent between the platform and at least one numbing finger.

At least one embodiment provides a trap having a housing that has a top, a bottom, a first side wall, a second side wall, a back wall, and an entrance providing a passageway into the housing, at least one numbing finger coupled to the housing with each numbing finger extending laterally towards the entrance, a trigger plate pivotally coupled to the housing and residing above the bottom of the housing and adjacent to the entrance in a latched or set position, a biasing element biasing the trigger plate towards the back wall, and when the trigger plate is triggered by a rodent, the trigger plate pivots from the latched or set position towards the rear wall trapping the rodent between the trigger plate and at least one numbing finger.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF EMBODIMENTS

The following description is intended to convey a thorough understanding of the embodiments by providing a number of specific embodiments and details involving an animal trap. It is understood, however, that the invention is not limited to these specific embodiments and details, which are exemplary only. It is further understood that one possessing ordinary skill in the art, in light of known devices, systems and methods, would appreciate the use of the invention for its intended purposes and benefits in any number of alternative embodiments.

Generally speaking, the animal traps of the various exemplary embodiments described herein have a housing having an entrance providing a passageway into the housing, a platform or trigger plate coupled to the housing, which when an animal, such as a mouse, triggers the trap, the platform or trigger plate and mouse move towards the housing and traps the mouse against the housing.

The various exemplary embodiments generally described devices that "trap" an animal, e.g., a mouse. In the various embodiments, the animal may simply be trapped inside the device so that it cannot escape from the device. However, the embodiments are not so limited. In various embodiments, the trapped animal may be immobilized, injured or killed. For example, in various exemplary embodiments, the trapped animal may be immobilized inside the device by the device itself or by one or more blunt fingers inside the device. Where the trapped animal is a mouse, immobilizing the mouse may cause the mouse to develop hypothermia which may eventually kill the mouse. In other embodiments, the device may injure the trapped animal, such as by crushing it, or impaling it. In other embodiments, the trapped animal may suffer a fatal injury, such as a broken neck.

Figure 1:
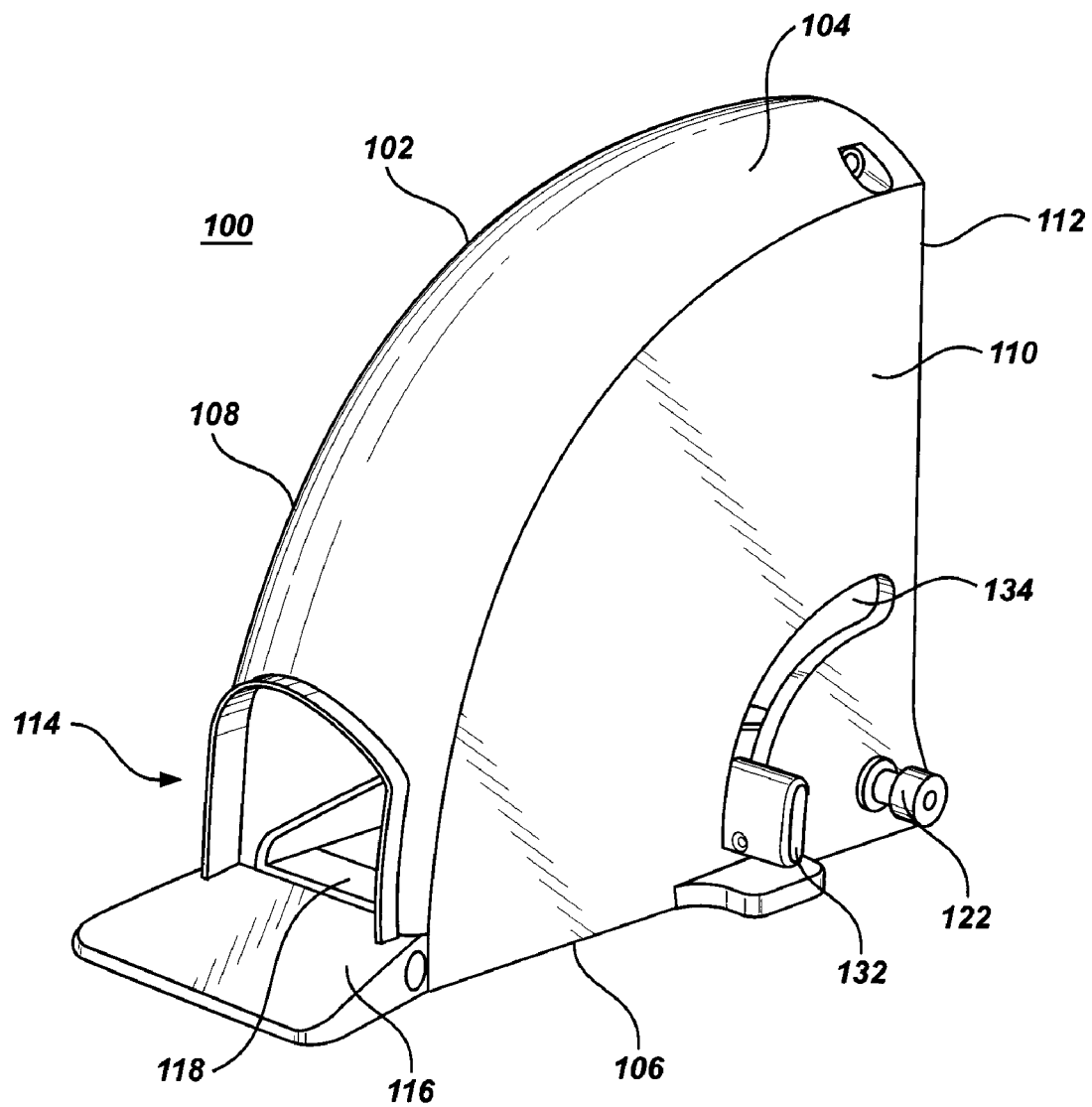
FIG. 1 depicts a perspective view of a trap in accordance with an exemplary embodiment.

Referring to FIG. 1, a perspective view of a trap in accordance with an exemplary embodiment is illustrated. It should be appreciated that trap 100 is a simplified view of an exemplary trap and may include additional elements that are not depicted. As shown, the trap 100 may include a housing 102. The housing 102 may include a top wall 104, a bottom 106 or base, a first side wall 108, a second side wall 110, and a back wall 112. Although the housing 102 is depicted as comprising one piece, the housing 102 may comprise multiple pieces. The top wall 104 may be rounded and extend from the back wall 112 towards the front of the housing 102. The housing 102 may include an entrance 114, e.g., a passageway into the housing 102. For example, the top wall 104 may form an entrance 114 at a location which is close to or at the junction where the top wall 104 meets the bottom 106 of the housing 102. The first side wall 108 and second side wall 110 may be positioned on the longer, opposite sides of the bottom 106. The back wall 112 and entrance 114 may be positioned on the narrower, opposite sides of the bottom 106. The housing 102 may include a ramp 116 at or near the entrance 114. The ramp 116 may be angled at a first end and terminate at a second end such that the higher end of the ramp 116 is approximately flush with a platform 118 which may be adjacent to the ramp 116. The incline of the ramp 116 may assist in attracting an animal to enter the trap 100.

Figure 2:
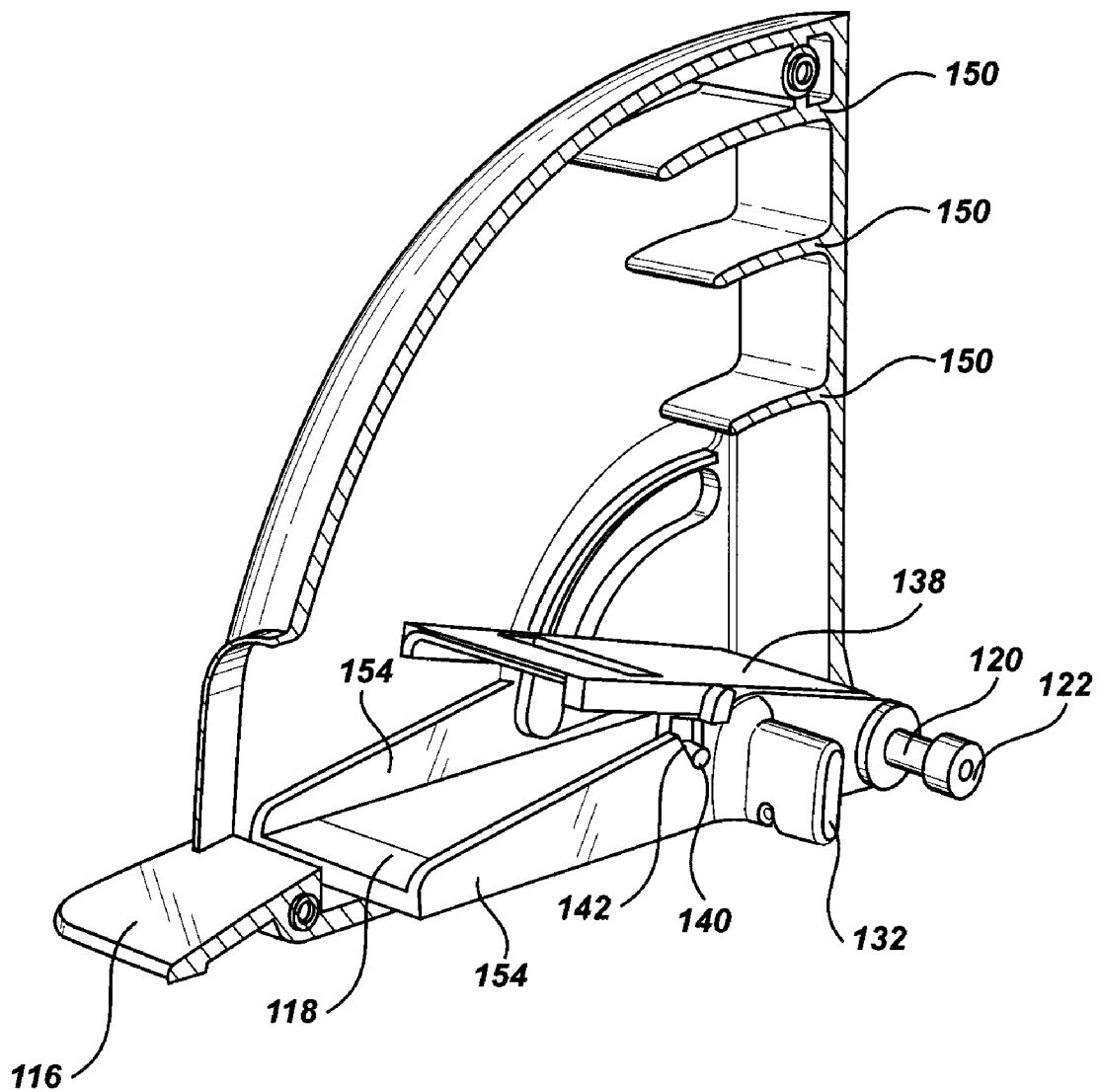
FIG. 2 depicts a perspective view of a trap, without a sidewall, in accordance with an exemplary embodiment.

Referring to FIG. 2, a perspective view of the trap, without a sidewall, in accordance with an exemplary embodiment is illustrated. As shown, the trap 100 may include a platform 118 pivotally coupled to the housing 102. A pivoting element may pivotally couple the platform 118 to the housing 102. For example, the pivoting element may include a rod 120 having one or two threaded ends. The platform 118 may include a slot (not shown) to receive the rod 120. The threaded ends of the rod 120 may extend beyond the first and second sidewalls, 108, 110. A nut 122 may secure each threaded end of the rod 120 to the housing 102. In other embodiments, a screw may be used in conjunction with or in place of the rod 120. In such an embodiment, the screw head and a nut 122 on the threaded end of the screw may secure the screw to the housing 102. In other embodiments, other pivoting elements may be used to pivotally couple the platform 118 to the housing 102.

Figure 3A:
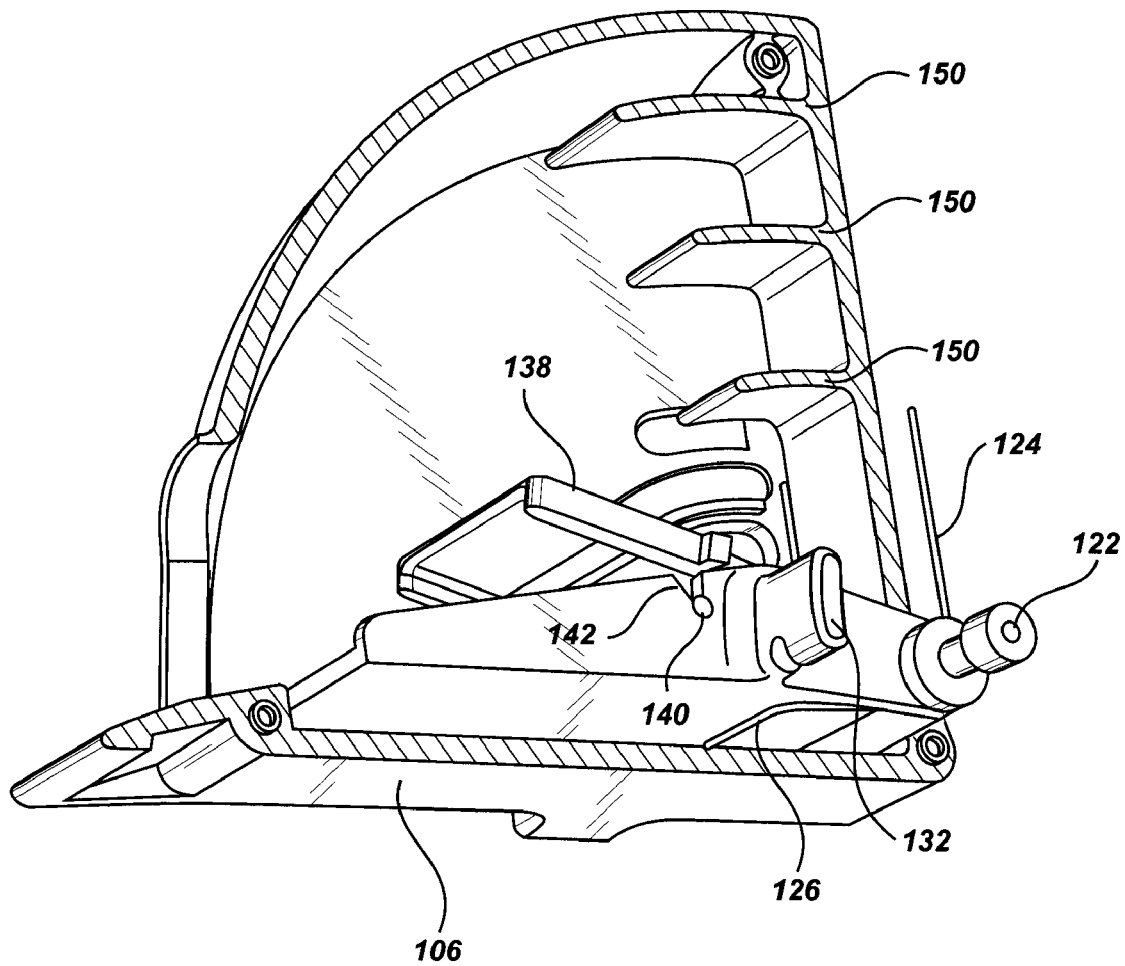
FIG. 3A depicts a perspective view of a trap having a biasing element in accordance with an exemplary embodiment.
Figure 3B:
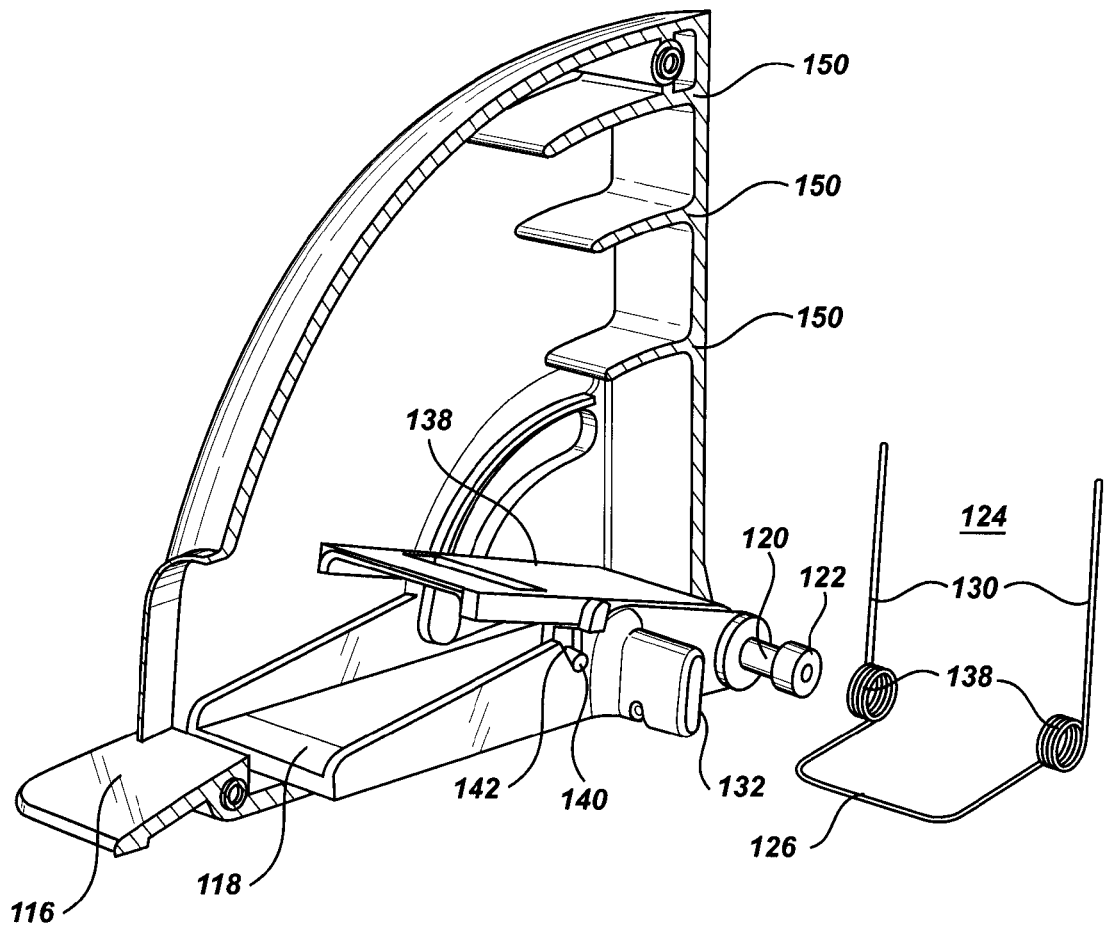
FIG. 3B depicts a perspective view of a trap and a biasing element in accordance with an exemplary embodiment.

Referring to FIGS. 3A and 3B, perspective views of the trap having a biasing element in accordance with an exemplary embodiment are illustrated. The biasing element 124 may bias the platform 118 towards the back wall 112 of the housing 102. As shown, the biasing element 124 may be a torsion spring. Specifically, the torsion spring 124 may be a double segmented torsion spring having a biased end 126, two coils 128, and two leverage ends 130. The biased end 126 may be positioned between the platform 120 and the bottom 106 of the housing 102. The coils 128 may form openings such that the coils 128 may receive the pivoting element, e.g., the rod 120, and couple the torsion spring 124 to the housing 102. The platform 118 may include one or more slots (not shown) to allow the coils 128 to reside in a position to receive the rod 120. The leverage ends 130 may be positioned within the housing 102 and may leverage the tension spring 124 against the back wall 112 of the housing 102. It is appreciated that a single segmented torsion spring having a single biased end 126, a single coil 128, and a single leverage end 130 may be used as well as other biasing elements which may bias the platform 118 towards the back wall 112 of the housing 102.

Figure 4:
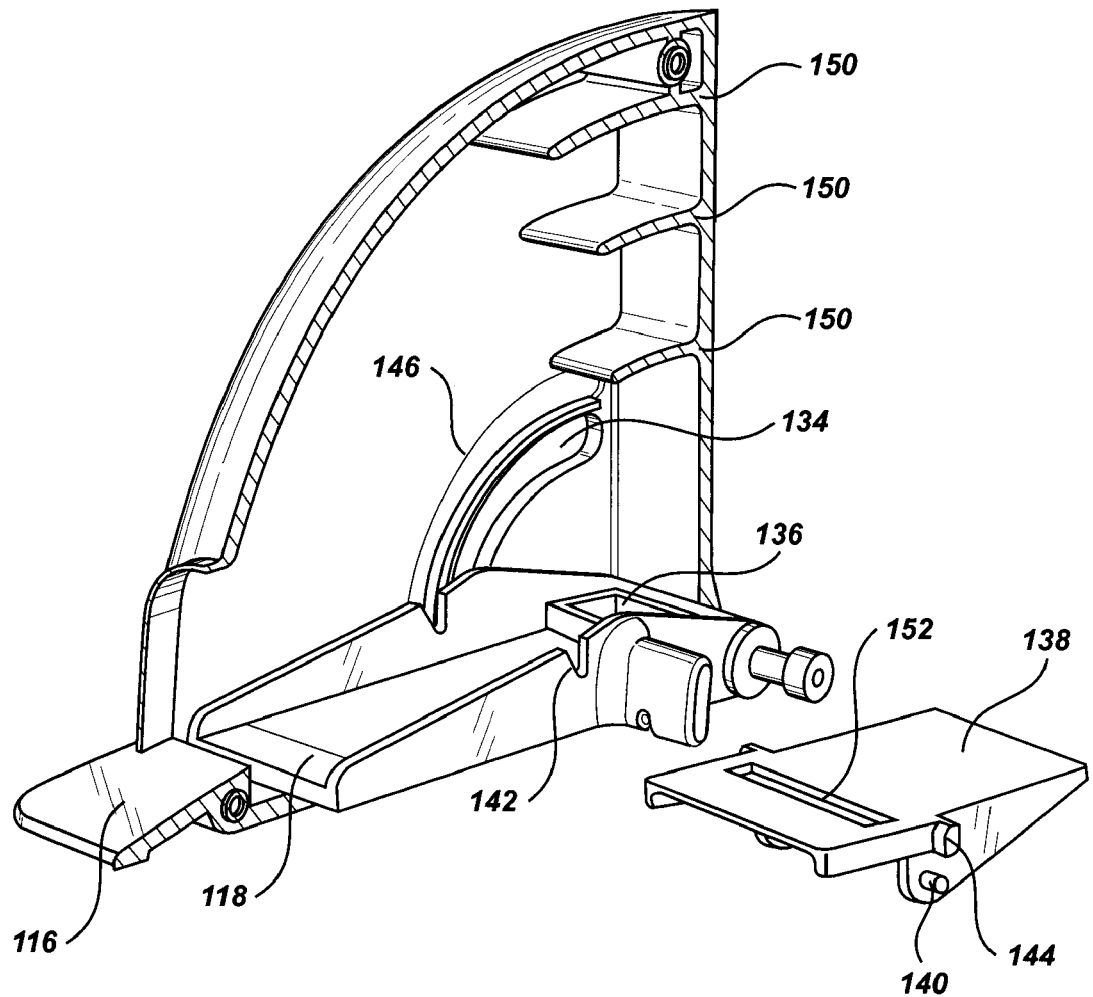
FIG. 4 depicts a perspective view of the platform and a trigger in accordance with an exemplary embodiment.

Referring to FIG. 4, a perspective view of the platform and a trigger in accordance with an exemplary embodiment is illustrated. As shown, the platform 118 may include sides 154 which may assist in positioning an animal on the platform 118 by directing the animal towards the center of the platform 118. The platform 118 may include a tab 132 to assist in moving the platform 118. The tab 132 may extend from the platform 118, e.g., from a side 154 of the platform. The tab 132 may be used to move the platform 118 from a triggered position, e.g., when the platform 118 is biased towards the rear wall 110, to a latched position, e.g., when the platform 118 is positioned on top of the bottom 106 of the housing 102 (adjacent to the entrance 114). The housing 102 may include one or more slots 134 or cutouts from which a tab 132 may extend from the interior of the housing 102 to the exterior of the housing 102. It is appreciated that multiple tabs 134 and multiple slots 134 may be used or other setting means may be used to move the platform 118 from the triggered position to the latched position. For example, the platform 118 may have tabs 132 that extend from two sides of the platform 118. In another example, a push bar (not shown) may have one end extend from the back wall 112 (via an aperture) with the other end coupled to the platform 118. By pushing on the push bar, the platform 118 may be moved from a triggered position to a latched position. In yet another example, a handle or lever (not shown) may have one end extend from the housing 102 (via an aperture) with the other end coupled to the platform 118. By moving the handle or lever from a first position to a second position, the platform 118 may be moved from a triggered position to a latched position.

The platform 118 may include an attractant reservoir 136 configured to hold an attractant (not shown). The attractant may be a scent, a rodenticide, and/or bait. The housing 102 may include an opening (not shown) to allow an attractant to be placed in the attractant reservoir 136. For example, the opening may allow a knife having food, e.g., peanut butter or cheese, to be placed in the attractant reservoir 136 to assist in attracting an animal, such as a mouse, to the trap 100. More specifically, the attractant may assist in attracting an animal onto the platform 118.

Referring to FIG. 2 again, the trap 100 may include a trigger (or trigger mechanism) 138 operatively coupled to the platform 118. More specifically, the trigger 138 may be pivotally connected to the platform 118. For example, the trigger 138 may include mating projections 140 on each side of the trigger 138. The mating projections 140 may be adapted to mate with mating slots 142 on the platform 118. The mating projections 140 and mating slots 142 may interact to allow the trigger 138 to pivot with respect to the platform 118. In other embodiments, other coupling elements may be used to couple a trigger 138 to a platform 118 in which the triggering of the trigger 138 causes the platform 118 to move towards the back wall 112 of the housing 102. In other embodiments, the platform 118 may move towards a wall of the housing 112 or towards the housing 112 if the housing 112 does not have a "wall."

Referring to FIG. 4 again, the trigger 138 may include one or more channel projections 144. Each channel projections 144 may extend from the side of the trigger 138 and may be adapted to interact with one or more corresponding channels 146 on the side walls 108, 110. It is appreciated that no guidance elements or other guidance elements may be used to assist in guiding the trigger 138 towards the back wall 112 of the housing 102.

Figure 5A:
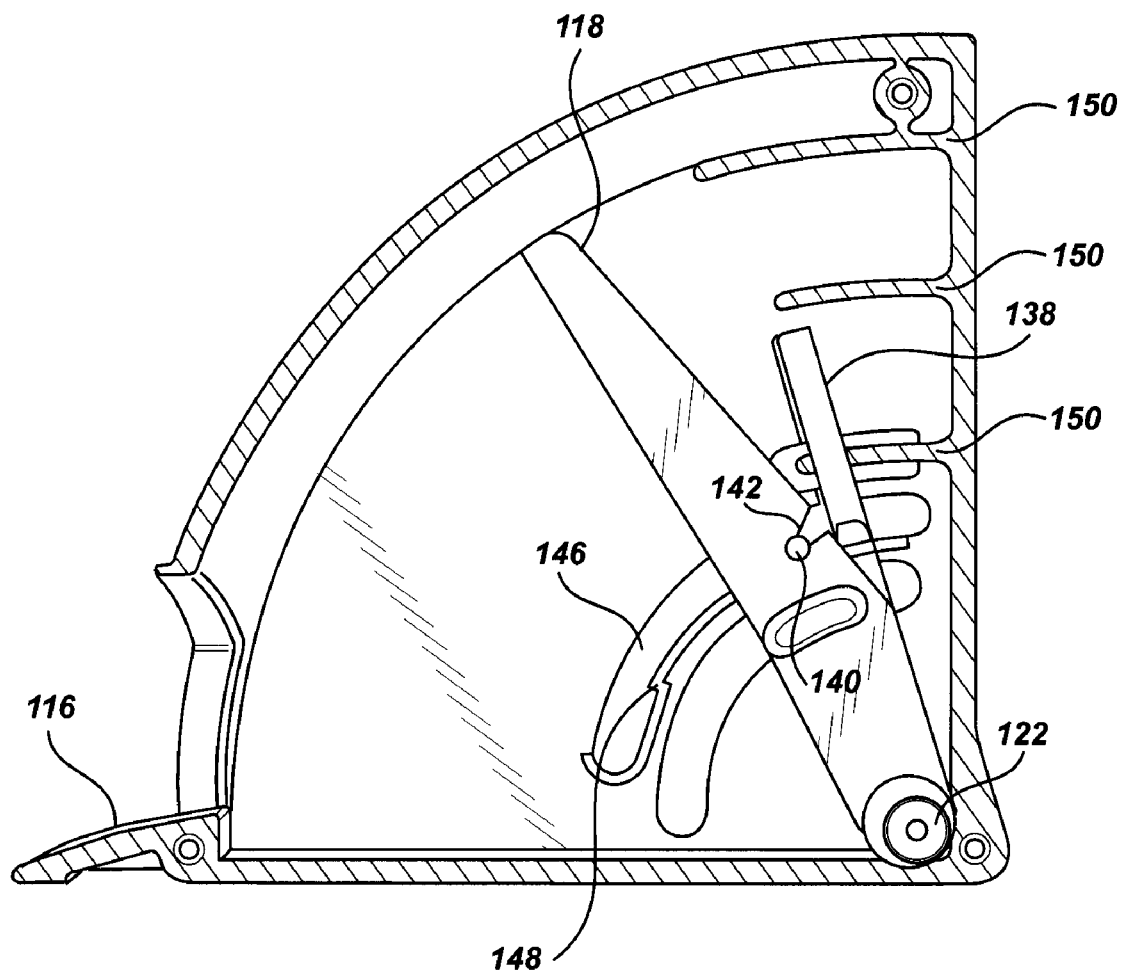
FIG. 5A depicts a side view of a trap in between the latched position and the unlatched position in accordance with an exemplary embodiment.
Figure 5B:
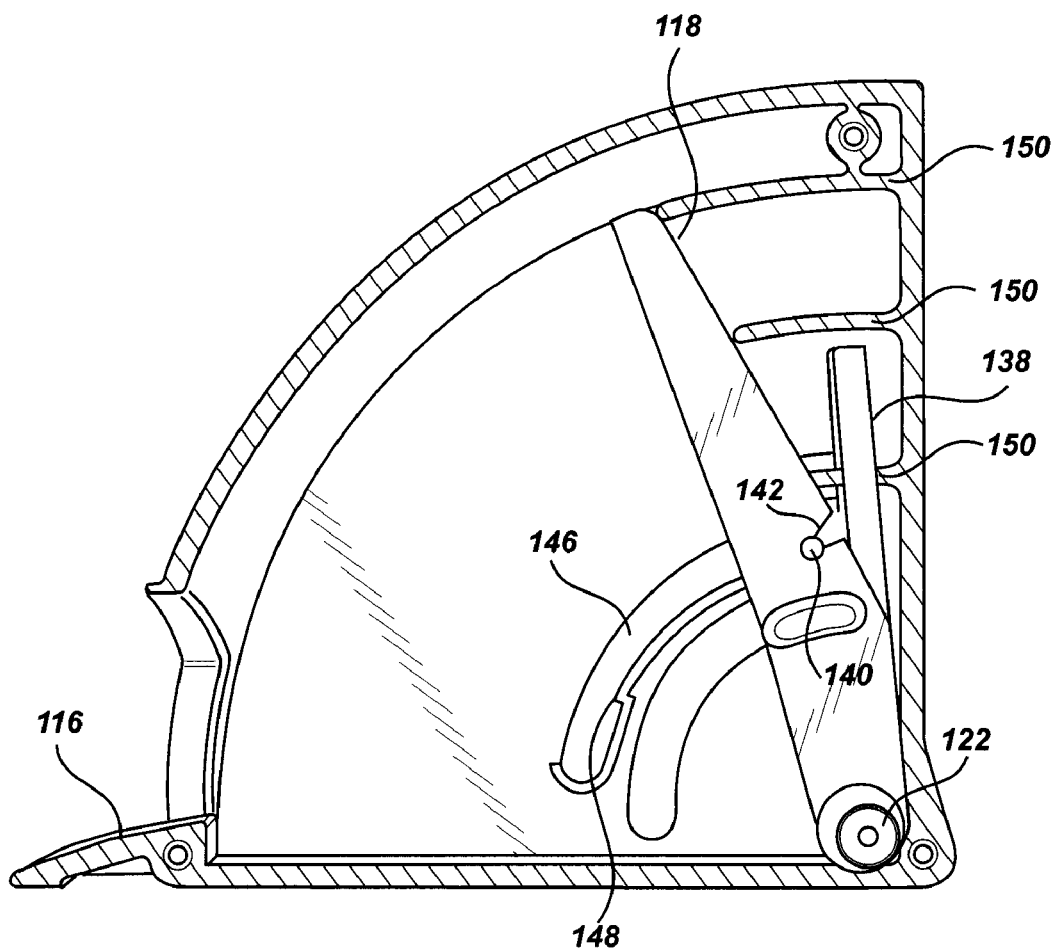
FIG. 5B depicts a side view of a trap in the unlatched position in accordance with an exemplary embodiment.

Referring to FIGS. 5A and 5B, perspective views of the platform in various unlatched positions in accordance with an exemplary embodiment are illustrated. As shown, a corresponding channel 146 may reside in the side wall 108. In addition, a corresponding channel 146 may reside in the other side wall 110. Each channel 146 may include a lip 148. The lip 148 may be located near the bottom of the side wall 108, 110. The lip 148 may be adapted to set or position the trigger 138 and platform 118 in a latched position when a channel projection 144 extending from the trigger 138 is positioned under the lip 148. For example, a channel projection 144 may extend from two sides of the trigger 138, with each channel projection 144 setting the trigger 138 and platform 118 in the latched position. When triggered, each channel projection 144 may unlatch from the lip 148 and move along the channel 146 towards the back wall 112 of the housing 102. Thus, the lip 148 may be a retention mechanism for retaining the platform 118 in the latched or set position. During this movement, each channel projection 144 may slidingly engage with a corresponding channel 146.

Referring to FIG. 2 again, the trap 100 is shown in a latched position. When setting the trap 100 in the latched position, the platform 118 (and connected trigger 138) are moved from the triggered position, e.g., when the platform 118 is biased against the back wall 112, to the latched position, e.g., when the platform 118 is positioned above the bottom 106 of the housing 102. In the latched position, the platform 118 may be adjacent to the entrance 114. To move the platform 118 from the triggered position to the latched position, a force may be applied to the tab 132 to move the platform 118 to the latched position. In other embodiments, a push bar, handle, lever, or another means for moving the platform 118 and trigger 138, may be used. When moving the platform 118 to the latched position, each channel projection 146 slides or moves in the corresponding channel 146 until the channel projection 146 catches the lip 148. When an animal, such as a mouse, enters the trap 100 via the entrance 114, the animal crosses the ramp 146 and steps on the platform 118. When the animal triggers the trigger 138, e.g., each channel projection 144 unlatches from the lip 148 in the channel 146 and the biasing element 126 causes the platform 118 (and animal) to move towards the back wall 112 of the trap 100. For example, when a mouse brushes or pushes the trigger 138 upwards, the trigger 138 is triggered and the platform 118 and mouse move towards the back wall 112 where the mouse is trapped between the platform 118 and the back wall 112 of the housing 102.

Referring to FIGS. 5A and 5B again, the trap 100 may include one or more blunt fingers 150, e.g., protrusions. As shown, the blunt fingers 150 extend, e.g., laterally, from the back wall 112. In other embodiments, one or more blunt fingers may extend, e.g., laterally, from the first side wall 108 and/or the second side wall 110. In other embodiments, the one or more blunt fingers may extend from the top 104 of the housing 102. The one or more blunt fingers 150 may have different widths, e.g., the distance each extends from the back wall 112. The blunt fingers 150 may assist in trapping an animal within the trap 100. For example, when the trap 100 is triggered as recited above, the biasing element 128 biases the platform 118 towards the back wall 112, the mouse may contact the one or more blunt fingers 150. As shown in FIGS. 2, 5A and 5B, the trigger 138 may include one or more slots 152 which allow the blunt fingers 150 to pass through the trigger 138. Depending on the configuration of the blunt fingers 150, the mouse may be trapped within the trap 100 between the platform 118 and the one or more blunt fingers 150. The one or more blunt fingers 150 may be adapted to impale the animal or to assist in trapping the animal without impaling the animal. In other embodiments of the trap 100 that do not include blunt fingers 150, the animal may be trapped between the platform 118 and the back wall 112. In other embodiments, e.g., the traps 600, 700, 800 recited below, may include one or more blunt fingers 150. An animal, such as a mouse, may be trapped between the platform of the traps and one or more blunt fingers 150 as recited above.

Figure 6:
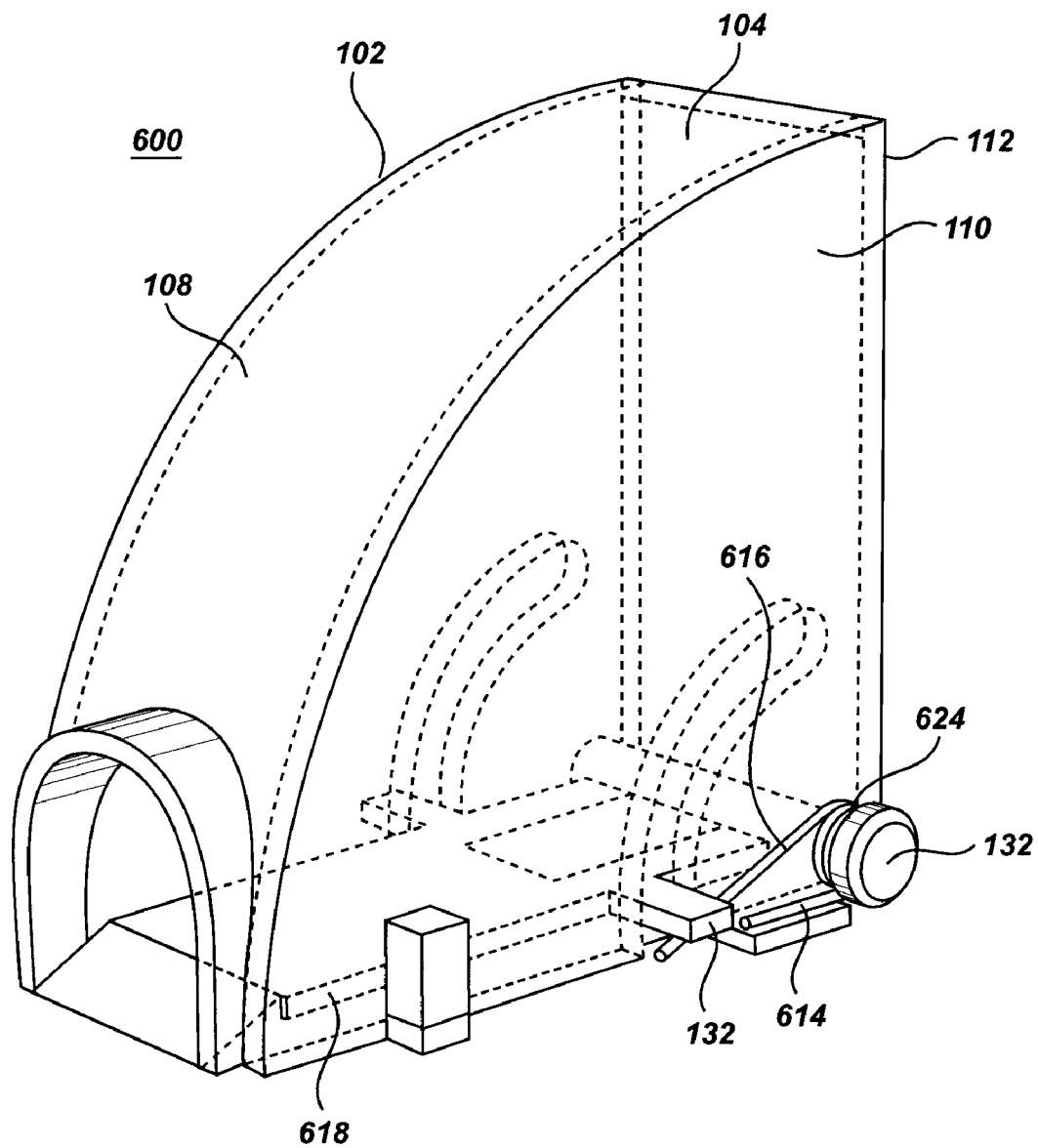
FIG. 6 depicts a perspective view of a trap in accordance with an alternate exemplary embodiment.

Referring to FIG. 6, a perspective view of a trap in accordance with alternative exemplary embodiment is illustrated. It should be appreciated that trap 600 is a simplified view of another embodiment of the trap 100 illustrated in FIG. 1 and may include additional elements that are not depicted. The trap 600 illustrated in FIG. 6 is similar to the trap 100 illustrated in FIG. 1. For example, the housing 102 is similar and the platform 618 is pivotally coupled to the housing 102. However, the platform 618 and trigger 638 in FIG. 6 differ from the platform 118 and trigger 138 in FIG. 1. In other embodiments, other platforms and/or triggers may be used where the platform moves from a latched position towards the back wall 112 of the housing 102 when the trigger is triggered.

Figure 7:
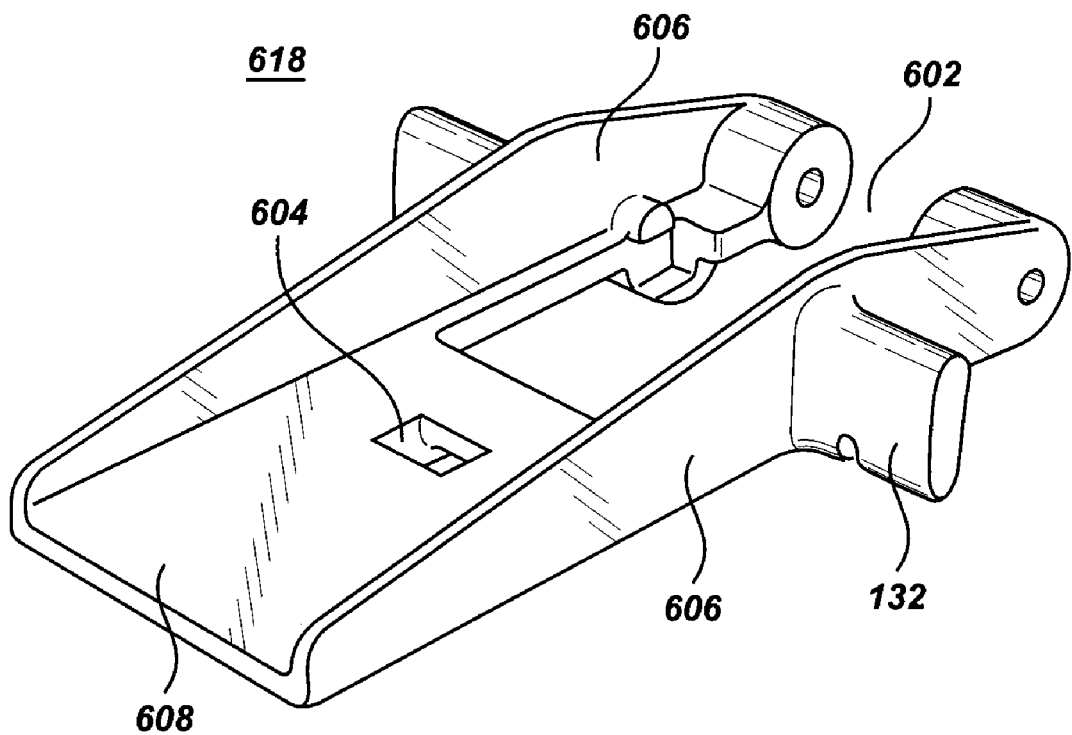
FIG. 7 depicts a perspective view of a platform in accordance with an alternate exemplary embodiment.

Referring to FIG. 7, a perspective view of the platform 618 in accordance with an alternative exemplary embodiment is illustrated. As shown, the platform 618 may include a cutout 602, an aperture 604, sides 606, and a surface 608. The cutout 602 may be adapted to receive a trigger 638 (discussed in further detail below). The aperture 604 may be adapted to receive a catch tab 610 of a catch 612 (discussed in further detail below). The sides 606 may assist in positioning an animal on the platform 618 by directing the animal towards the center of the platform 618. The surface 608 of the platform 618 may be flat or angled. For example, the surface 608 of the platform 618 may be angled and continue the incline of the ramp 116.

Referring to FIG. 6 again, the trap 600 may include a biasing element 624 to bias the platform 618 towards the back wall 112. As shown, the biasing element 624 may be a spring, such as a tension spring, operatively coupled to the rod 120. The biasing element 624 may be positioned between the exterior of a side wall, such as the second side wall 110, and a nut 122. As shown, the biasing element 624 may have a first end 614 anchored or tensioned against the bottom 106 of the housing 102 and a second end 616 anchored or tensioned against the tab 132 of the platform 618. In other embodiments, the biasing element 624 may be positioned within the housing 102. For example, the biasing element 624 may be positioned in the interior of the housing 102 with the first end 614 and second end 616 of the biasing element 624 residing inside the housing 102 as well. In other embodiments, other biasing elements may be used to bias the platform 618 towards the back wall 112 of the housing 102.

Figure 8:
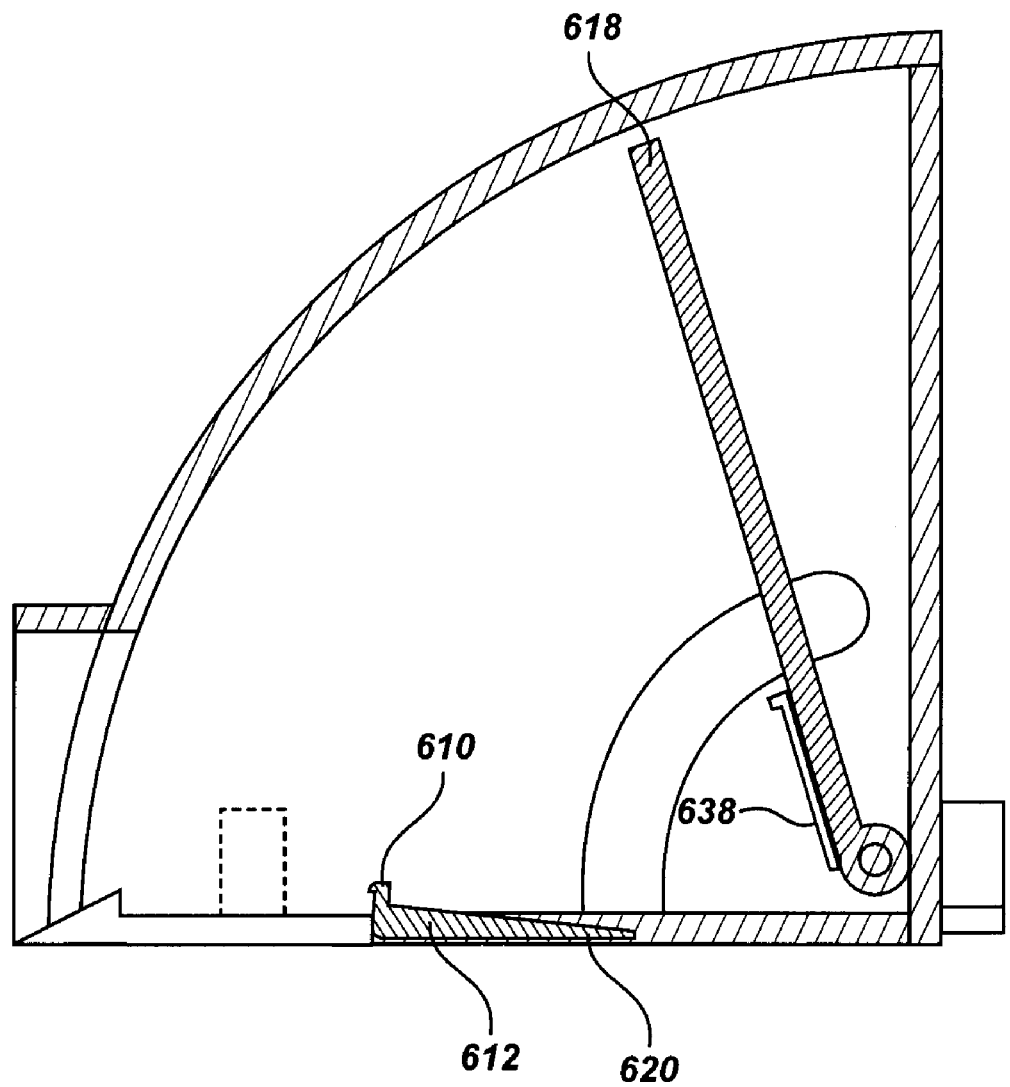
FIG. 8 depicts a side view of a trap in the unlatched position in accordance with an alternate exemplary embodiment.
Figure 9:
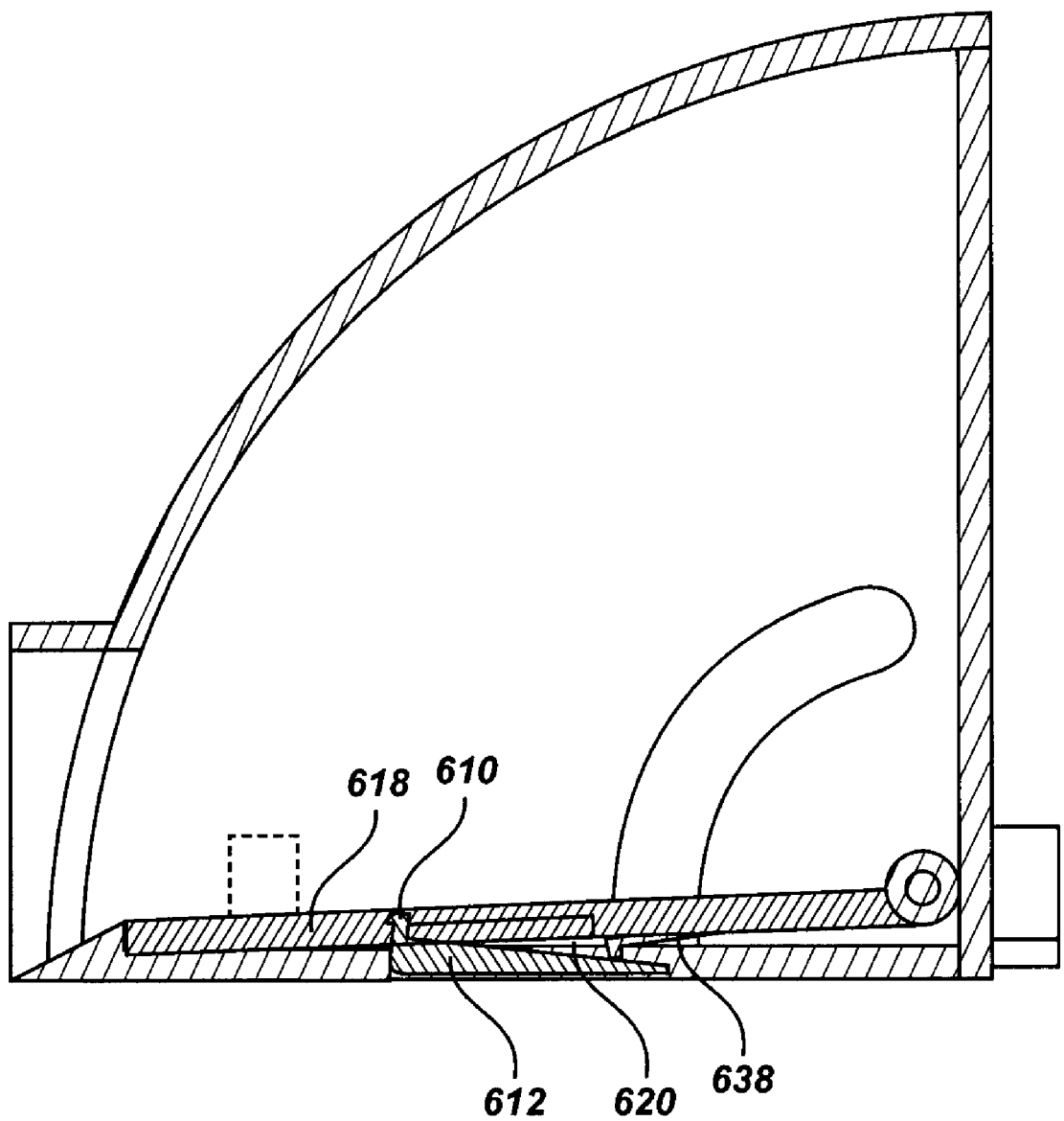
FIG. 9 depicts a side view of a platform in the latched position in accordance with an alternate exemplary embodiment.
Figure 10:
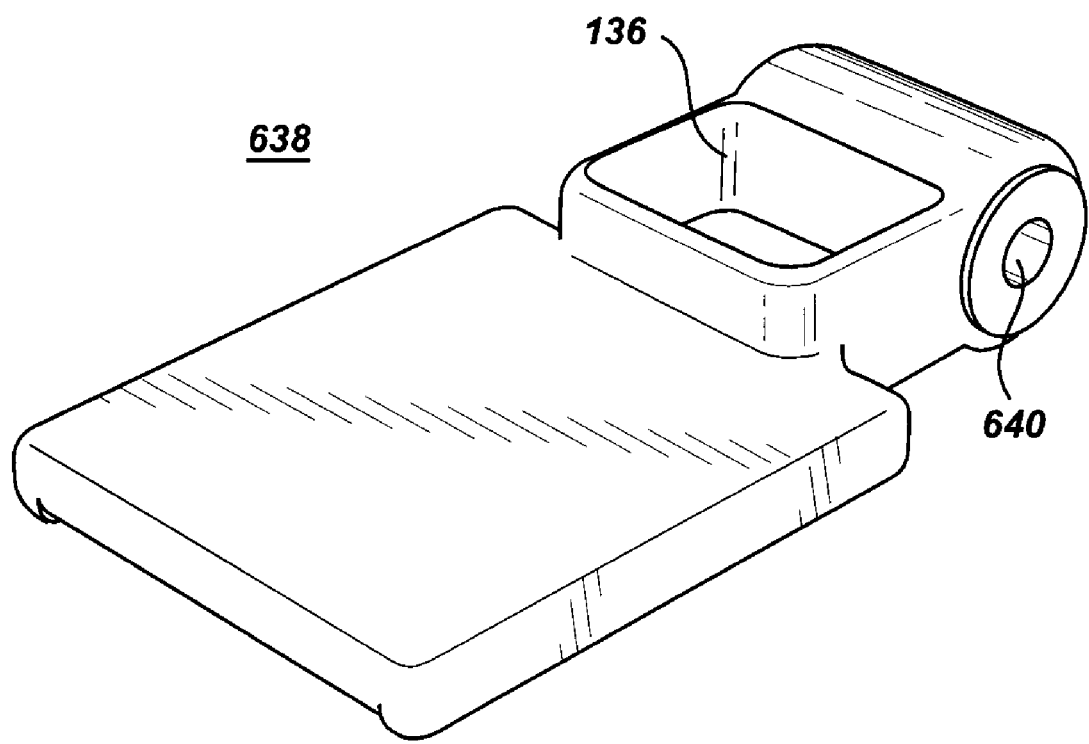
FIG. 10 depicts a perspective view of a catch in accordance with an alternate exemplary embodiment.

Referring to FIGS. 8 and 9, side views of the trap with the platform in the triggered position and in the latched position, respectively, in accordance with alternative exemplary embodiments are illustrated. As shown, the trap 600 may include a trigger (or trigger mechanism) 638 embedded in the platform 618, e.g., in the cutout 602 of the platform 618, and a catch 612 positioned below the platform 618. The trigger 638 may be operatively coupled to the housing 102. For example, the trigger 638 may include a slot 640 (as shown in FIG. 10) which may receive the rod 120, thus pivotally connecting the trigger 638 to the housing 102. As shown in FIG. 8, when the platform 618 is in the triggered position, the trigger 638 may move with the platform 618 since the trigger 638 is embedded in the platform 618 and is pivotally coupled to the rod 120. The trigger 638 may be pivotally coupled to the rod 120 such that when the platform 618 is in the latched position, the trigger is approximately flush with the surface 608 of the platform 618 and may be adjacent the entrance 114. The trigger 638 may include a downward protrusion or tab 620 at one end of the trigger 638 with the downward protrusion 620 extending downward towards the bottom 106 of the housing 102 when the platform 618 is in the latched position. The trigger 638 may be adapted to be operatively coupled to the catch 612 in the latched position. As shown in FIG. 9, when the platform 618 is in the latched position, the downward protrusion 620 may either be in contact or proximate to the catch 612. The trigger 638 may be pivotally positioned such that when the platform 618 is in the latched position and weight is placed on the trigger 638, e.g., a mouse steps on the trigger 638, the trigger 638 may pivot downward. In response to the trigger 638 pivoting downwardly, the catch 612 may move, e.g., pivoting away from the aperture 604 in the platform 618, releasing the platform 618. The biasing element 624 may cause the platform 618 to move towards the back wall 112. As a result, the animal, e.g., mouse, may be trapped between the platform 618 and the back wall 112. If the housing 102 includes the one or more blunt fingers 150 as described above with reference to trap 100, the animal, e.g., mouse, may be trapped between the platform 618 and one or more blunt fingers 150.

Referring to FIG. 10, a perspective view of a trigger 638 in accordance with an alternative exemplary embodiment is illustrated. As shown, the trigger 638 may include an attractant reservoir 136 configured to hold an attractant (not shown). The attractant may be a scent, a rodenticide, and/or bait. The back wall 112, first side wall 108, and/or second side wall 110 may include an opening (not shown) to allow an attractant to be placed in the attractant reservoir 136. For example, using a knife, peanut butter or cheese may be placed in the attractant reservoir 136 to assist in attracting an animal, such as a mouse, to the trap 100.

Figure 11:
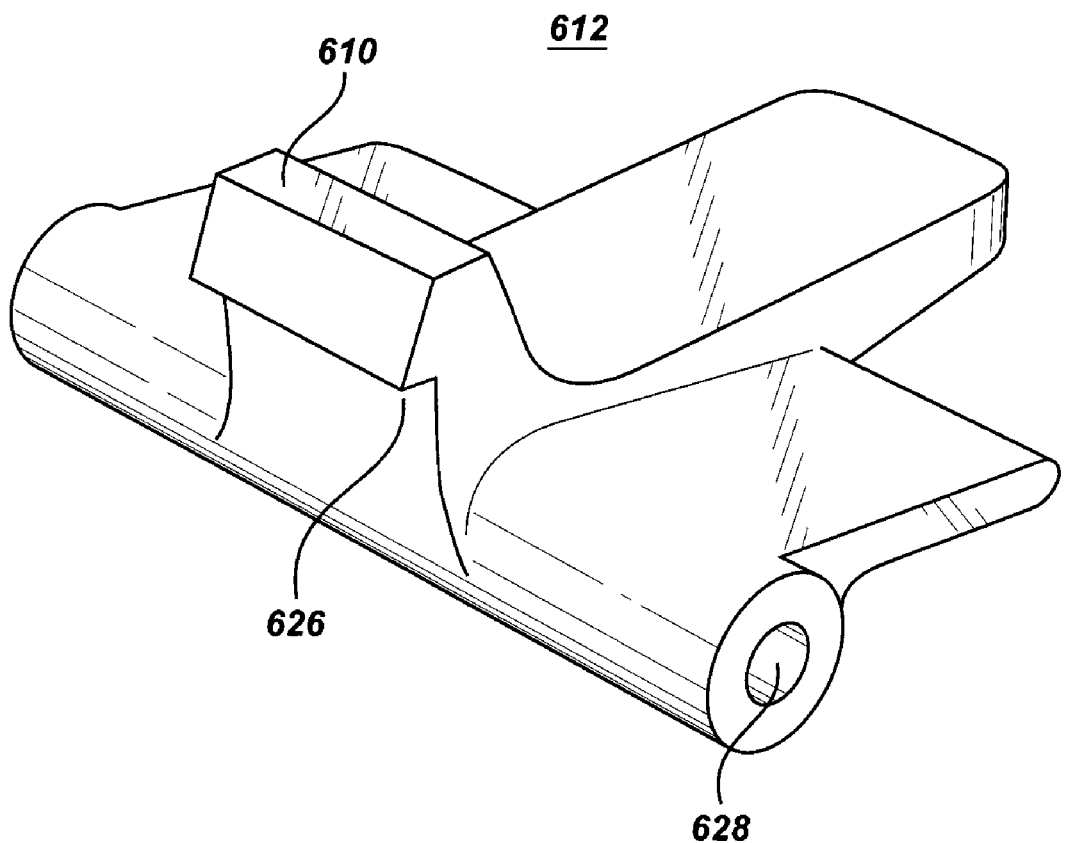
FIG. 11 depicts a perspective view of a trigger in accordance with an alternate exemplary embodiment.

Referring to FIG. 11, a perspective view of a catch 612 in accordance with an alternative exemplary embodiment is illustrated. As shown, the catch 612 may include an upward protrusion or catch tab 610 with a lip 626 adapted to engage the aperture 604 in the platform 618 and to assist in retaining the platform 618 in the latched position. Thus, the lip 626 may be a retention mechanism for retaining the platform 618 in the latched or set position. The platform 618 may be adapted, near the aperture 604, to receive the catch tab 610 and lip 626 such that the lip 626 may engage the platform 618 when the catch 612 is positioned to retain the platform 618 in the latched position. The catch 612 may be pivotally coupled to the housing 102. For example, the catch 612 may include a slot 628 adapted to receive a rod (not shown) which may be anchored in either the bottom 106 of the housing 102 or to the housing 102, e.g., to the first and second side walls 108, 110. By pivoting the catch 612, the catch 612 may engage the platform 618, e.g., the catch tab 610 may protrude through the aperture 604 in the platform 618 and retain the platform 618 in the latched position. When a force is applied to the trigger 638 (e.g., an animal steps on the trigger 638), the trigger 638 pivots downward causing the downward protrusion 620 of the trigger 638 to force the catch 612 to pivot or move, thereby causing the lip 626 of the upward catch tab 610 to unlatch or disengage from the platform 618, thereby releasing the platform 618 to move towards the back wall 112 due to the biasing element 624.

Figure 12:
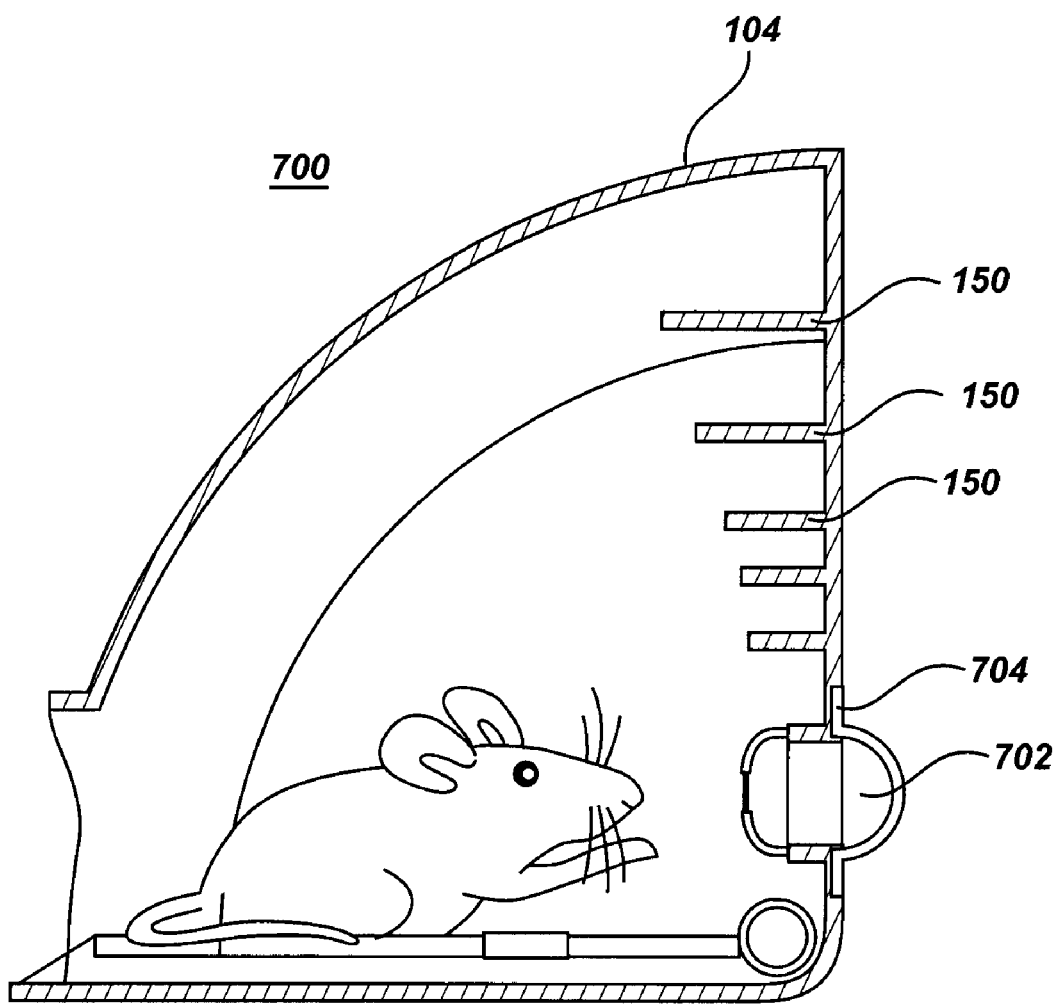
FIG. 12 depicts a side view of a trap, in the latched position, having a blister pack in accordance with an alternate exemplary embodiment.

Referring to FIG. 12, a side view of a trap, in the latched position, having a blister pack in accordance with an alternative exemplary embodiment is illustrated. As shown, the trap 700 may include a blister pack 702 operatively coupled to the back wall 112. The blister pack 702 may include an attractant, such as a scent, rodenticide, and/or bait. The back wall 112 may include an opening 704 adapted to receive the blister pack 702. The use of opening 704 may allow for the replacement of the blister pack 702. For example, if the trap 700 has not trapped an animal for a period of time, the existing blister pack 702 may be replaced with other another blister pack 702 having a different attractant.

Figure 13:
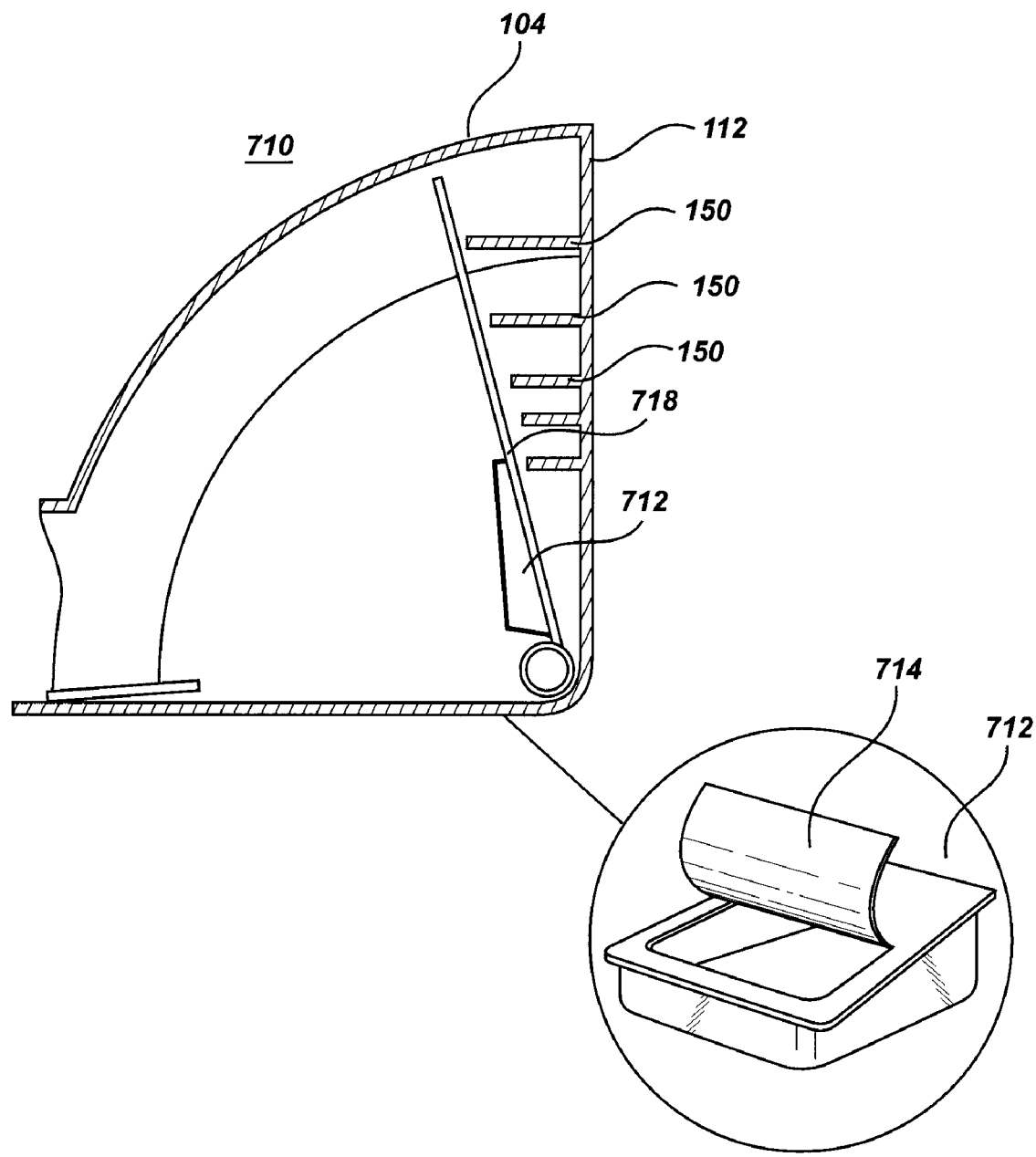
FIG. 13 depicts a side view of a trap, in the unlatched position, having a bait trap in accordance with an alternate exemplary embodiment.

Referring to FIG. 13, a side view of a trap, in the triggered position, having a bait trap in accordance with an alternative exemplary embodiment is illustrated. As shown, the platform 718 may be configured to include a bait trap 712 for attracting an animal into the trap 710. The bait trap 712 may include a removable cover or flap 714 which when opened, e.g., pulled off or back, bait inside the bait trap 712 may be exposed. In other embodiments, the bait trap 712 may include other attractants, such as scents or rodenticide. The flap 714 may be operatively coupled to the back wall 112 with the platform 718 in the triggered position when sold, thus when the platform 718 is moved to the latched position, the removable cover or flap 714 may peel off or back exposing the bait.

Figure 14:
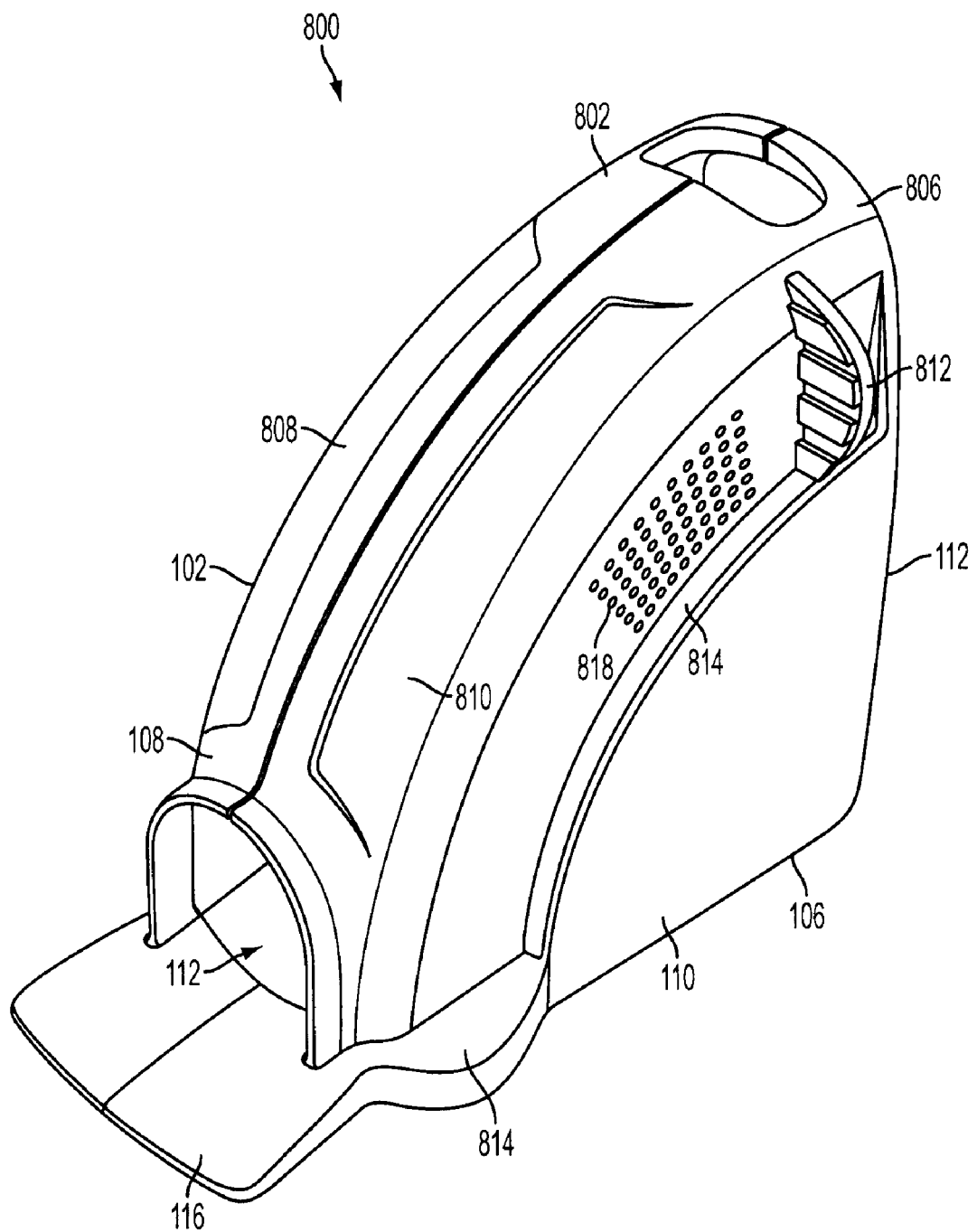
FIG. 14 depicts a perspective view of a trap in accordance with a preferred exemplary embodiment.
Figure 26:
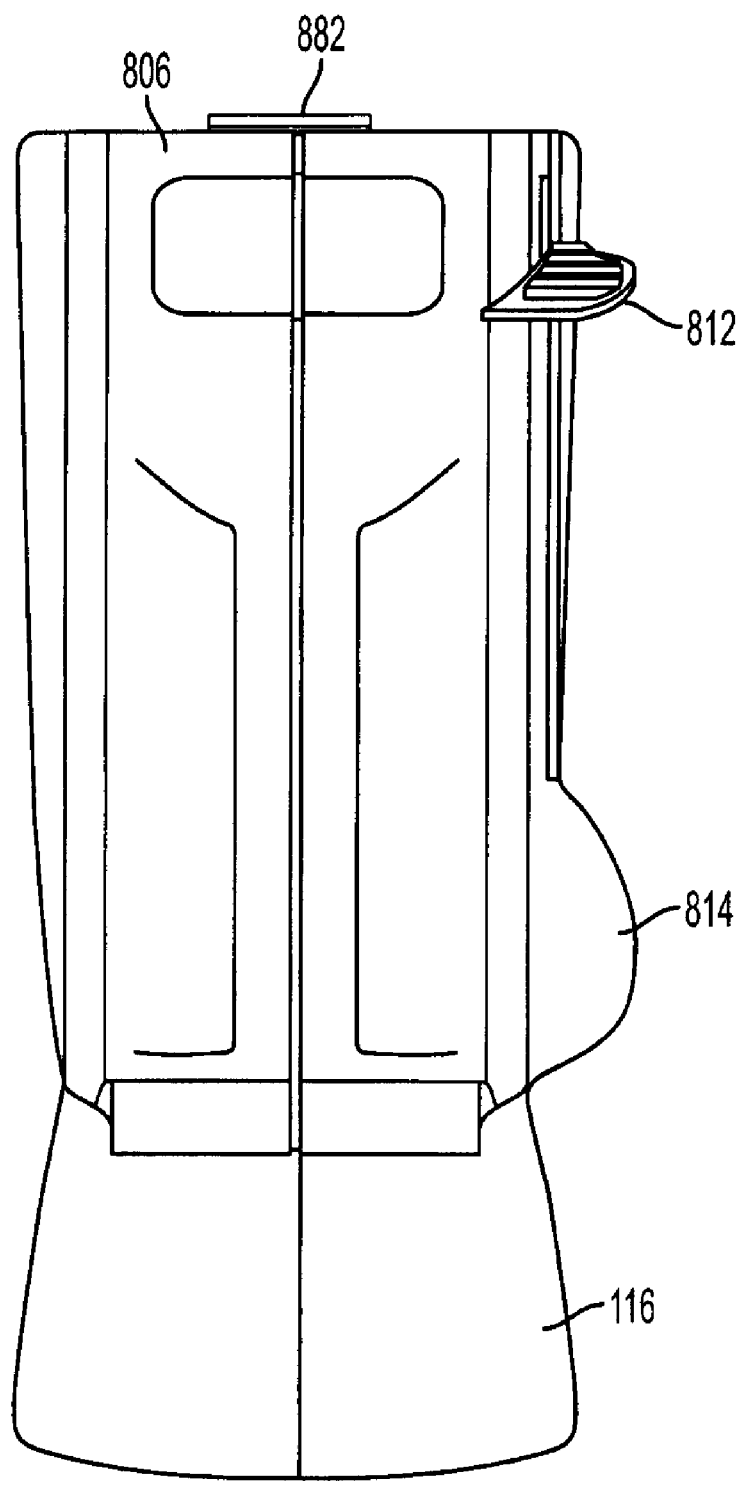
FIG. 26 depicts a top view of the trap in an unlatched position in accordance with a preferred exemplary embodiment.

Referring to FIG. 14, a perspective view of a trap in accordance with a preferred exemplary embodiment is illustrated. It should be appreciated that trap 800 is a simplified view of a preferred trap and may include additional elements that are not depicted. As shown, the trap 800 may include a first housing member 802 and a second housing member 804 which may be configured to interact and form a housing 102 for the trap 800. Although the housing 102 is depicted as comprising two pieces, e.g., first housing member 802 and second housing member 804, the housing 102 may comprise more or less pieces or components. The housing 102 may include a top wall 104, a bottom 106 or base, a first side wall 108, a second side wall 110, and a back wall 112. The housing 102 may include a grip 808, e.g., a finger grip. As shown in FIGS. 14 and 26, the finger grip 806 may extend between an opening or passageway in the top wall 104 and back wall 112 that allows a user to grab the trap 800. For example, a user may insert a finger in the opening and grab the finger grip 806 or may use two fingers to pinch the finger grip 806. It is appreciated that other grips may be used to grab the trap. For example, a tab may extend from the trap 800.

The top wall 104 may be rounded and extend from the back wall 112 towards the front of the housing 102. The top wall 104 may include indents 808, 810. The housing 102 may include an entrance 114, e.g., a passageway into the housing 102. For example, the top wall 104 may form an entrance 114 at a location which is close to or at the junction where the top wall 104 meets the bottom 106 of the housing 102. The first side wall 108 and second side wall 110 may be positioned on the longer, opposite sides of the bottom 106. The back wall 112 and entrance 114 may be positioned on the narrower, opposite sides of the bottom 106. The housing 102 may include a ramp 116 at or near the entrance 114. The ramp 116 may be angled at a first end and terminate at a second end such that the higher end of the ramp 116 is approximately flush with a trigger plate 802 which may be adjacent to the ramp 116 when the platform is in the set position. The incline of the ramp 116 may assist in attracting an animal to enter the trap 800.

Figure 24:
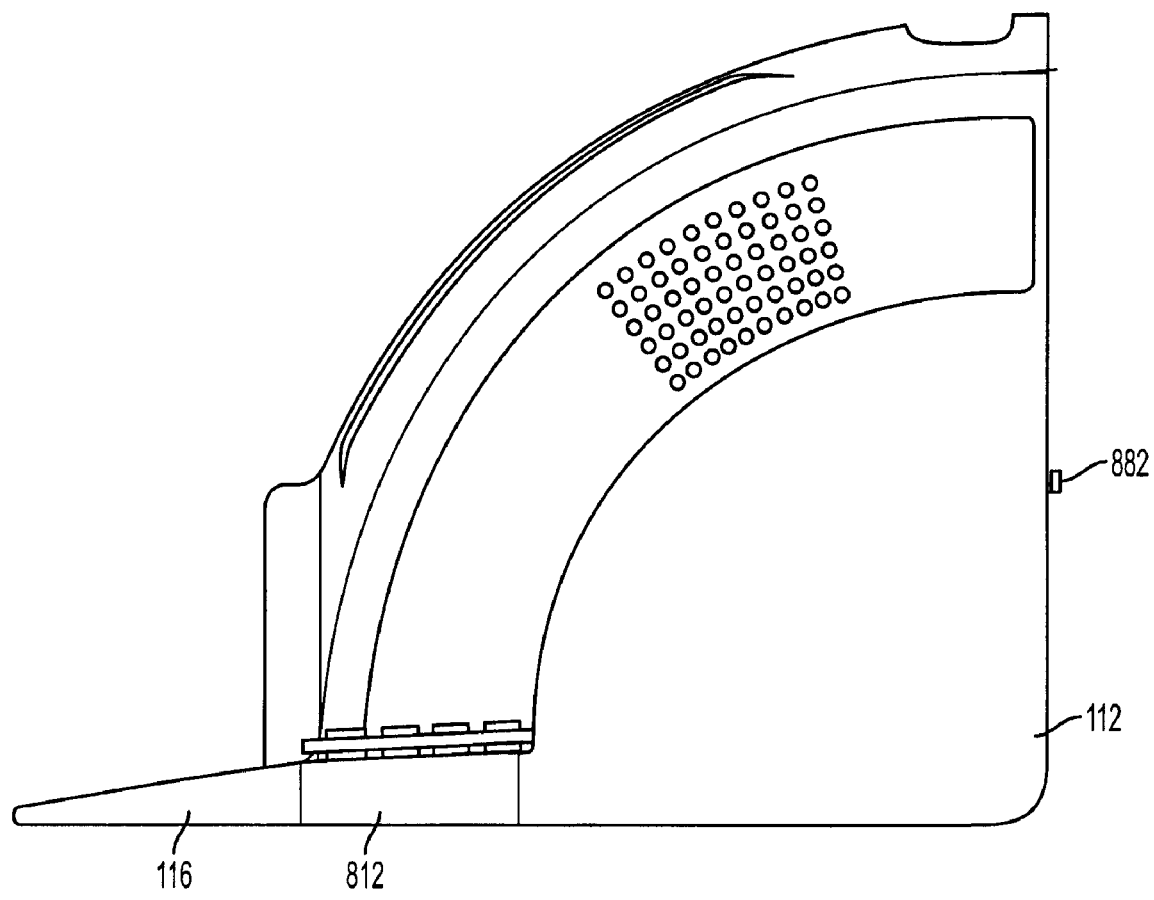
FIG. 24 depicts a first side view of the trap in the latched position in accordance with a preferred exemplary embodiment.

The trap 800 may include a set arm 812 for setting the trap 800. As shown, the set arm 810 is in an unlatched position. When force is applied to the set arm 812, the set arm 812 may move downwards through a channel 814, e.g., a slot in the housing 102 which provides a space for the set arm 812 to travel from an unlatched position (as shown in FIG. 14) to a latched position (as shown in FIG. 24). When an animal, e.g., a mouse, is trapped within the trap 800, the set arm 812 may be positioned between indicia 818, e.g., between the left side and right side of the indicia 818. As shown, the indicia 818 may be round indentations or recesses in the side of the housing 102. It is appreciated that other indicia 818 may be used to provide an indication that an animal, e.g., a mouse, is trapped within the trap 800. For example, a sticker or wording may be used in place of the indentations.

Figure 15:
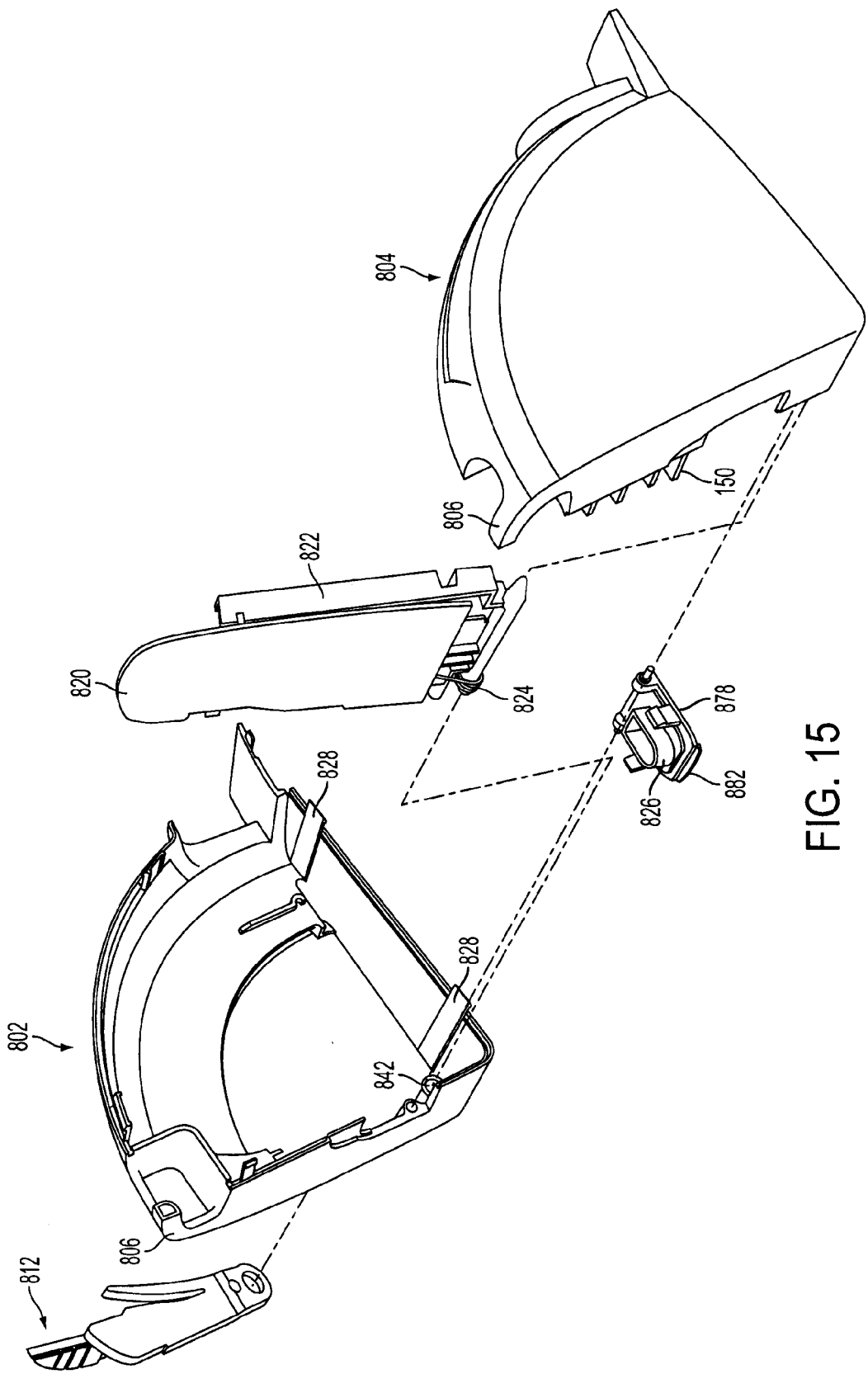
FIG. 15 depicts an exploded view of the trap in accordance with a preferred embodiment.
Figure 25:
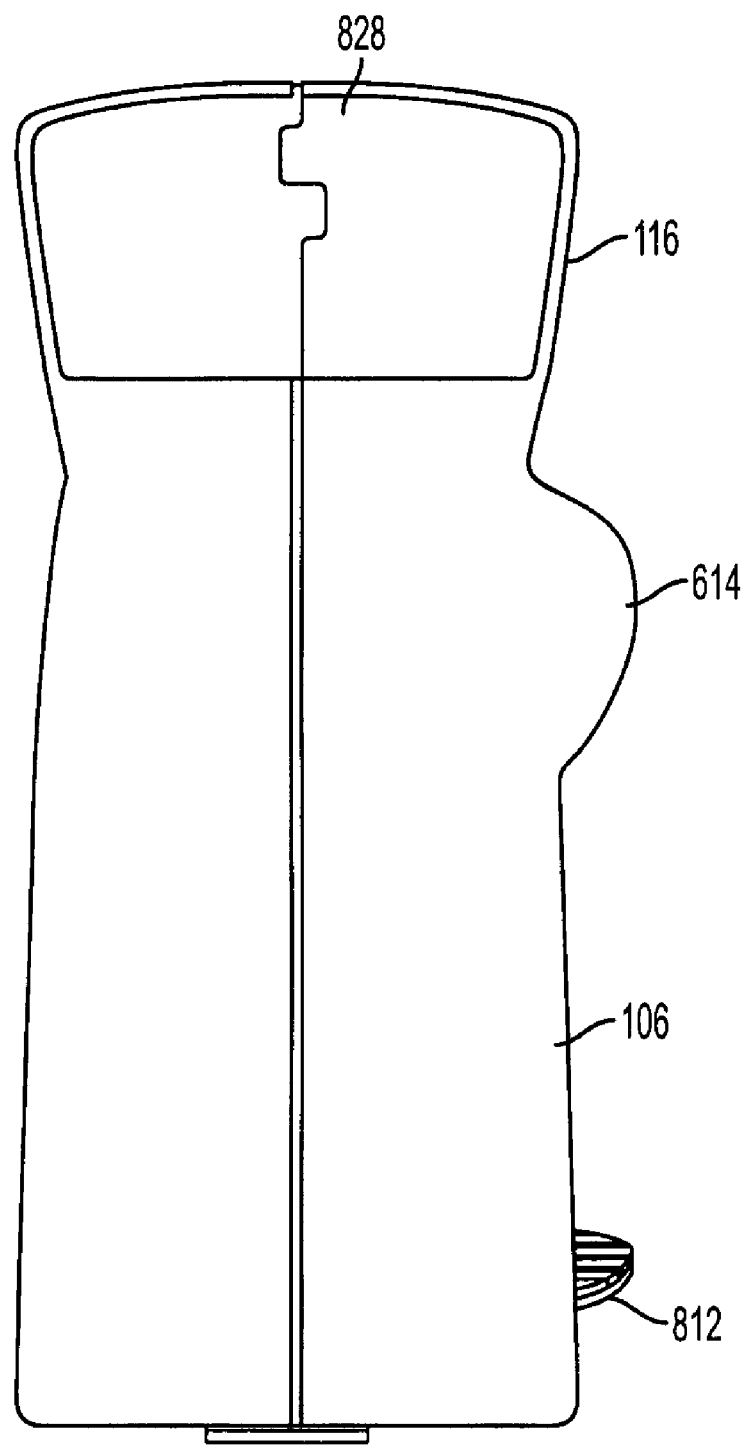
FIG. 25 depicts a bottom view of the trap in an unlatched position in accordance with a preferred exemplary embodiment.

Referring to FIG. 15, an exploded view of the trap in accordance with a preferred embodiment is illustrated. As shown, the trap 800 may include the first housing member 802, the second housing member 804, the set arm 812, a trigger plate 820, a platform plate 822, a biasing element 824, and an attractant reservoir 826. To join the first housing member 802 and the second housing member 804, the housing members 802, 804 may include housing tabs 828 and recesses (not shown) for receiving the housing tabs 828 and for holding the housing members 802, 804 together. It should be appreciated, that other mating pieces may be used to form the housing and/or the housing may be manufactured as one piece. For example, as shown in FIG. 25, the ramp 116 may include housing tabs 828 for holding the housing members 802, 804 together.

Figure 16:
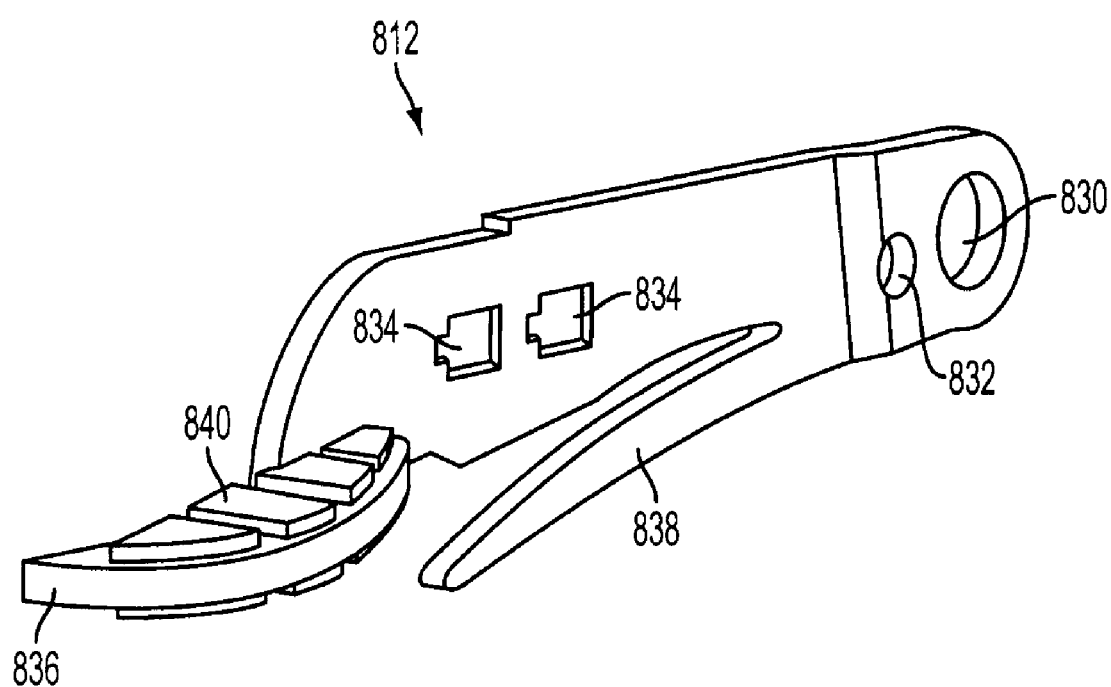
FIG. 16 depicts a perspective view of the set arm trap in accordance with a preferred exemplary embodiment.

Referring to FIG. 16, a perspective view of a set arm in accordance with a preferred embodiment is illustrated. As shown, the set arm 812 may include a pivoting recess 830, a coupling recess 832, one or more slots 834, a pressing area 836, and an integrated spring 838. The pivoting recess 830 may be adapted to receive a pivoting projection 842 from the first housing member 802. The interaction between the pivoting recess 830 and the pivoting projection 842 may allow the set arm 812 to pivot with respect to the housing 102. It should be appreciated that other pivoting mechanisms may be used to pivot the set arm 812 with a housing member 802, 804. The coupling recess 832 may be adapted to receive a coupling projection 844 from the platform plate 822. It should be appreciated that other coupling mechanisms may be used to couple the set arm 812 with the platform plate 822.

Figure 17:
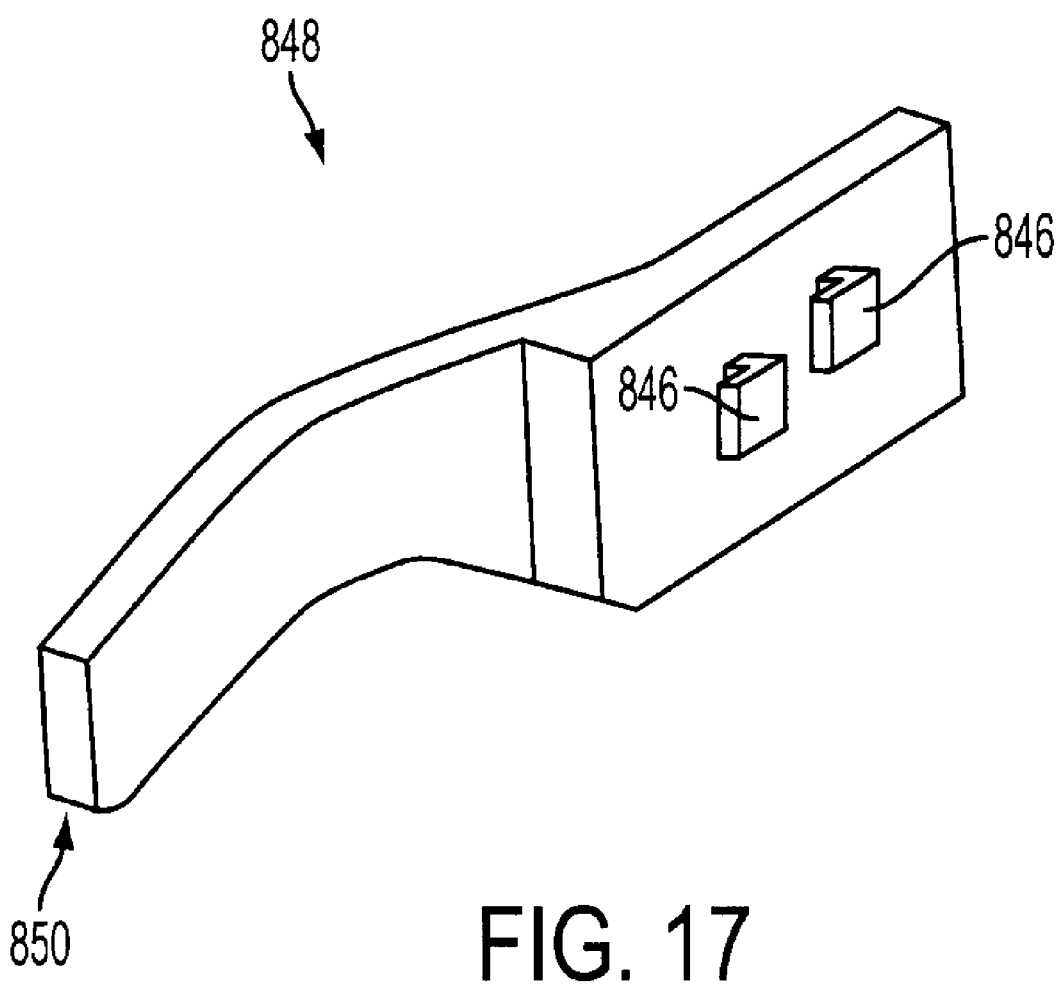
FIG. 17 depicts a perspective view of the lever in accordance with a preferred exemplary embodiment.

The one or more slots 834 may be adapted to receive one or more mating projections 846 from a lever 848 (discussed below). For example, as shown, the one or more slots 834 may comprise a larger area to receive the one or more mating projections 846 to the lever 848 (as shown in FIG. 17) and a smaller area to lock or snap the lever 848 with the set arm 812. It should be appreciated that other attaching mechanisms may be used to couple the lever 848 and set arm 812, as well as being formed as one piece. For example, the set arm 812 may include the one or more mating projections and the lever 848 may include the one or more slots.

The set arm 812 may include a pressing area 836, an area for a user to apply pressure on the set arm 812 to move the set arm 812 from an unlatched position to a latched position. As shown, the pressing area 834 may include one or more gripping members 836. The one or more gripping members 836 may project outward from the set arm 812 and form one or more raised areas on the set arm 812. The one or more gripping members 836 and set arm 812 may be one piece or may be multiple pieces. For example, the set arm 812 and the one or more gripping members 834 may be formed as one piece.

The integrated spring 838 may be located on the bottom of the set arm 812. In setting the trap 800, the set arm 812 may move from the unlatched position to a latched position. To achieve the latched position, the integrated spring 838 may be compressed which allows a setting tab 854 of the trigger plate 820 to interact with a notch 872 to set the trap 800 as explained in greater detail below. It is appreciated that other compressible mechanisms may be used.

Referring to FIG. 17, a perspective view of a lever in accordance with a preferred embodiment is illustrated. As shown, the lever 848 may include one or more mating projections 846 and a contact applicator 850. The one or more mating projections 846 may be adapted to interact with corresponding slots 834 in the set arm 812 and to couple the lever 848 and the set arm 812. The mating projections 846 may be dovetail shaped. The contact applicator 850 may be angled from the area of the lever 848 containing the mating projections 846. The contact applicator 850 may contact the top of the trigger plate 820 to assist in setting the trigger plate 820 in the latched position. For example, when the set arm 812 moves from an unlatched position to the latched position, the contact applicator 850 contacts the top surface of the trigger plate 820 moving the trigger plate 820 downward to a latched position.

Figure 18:
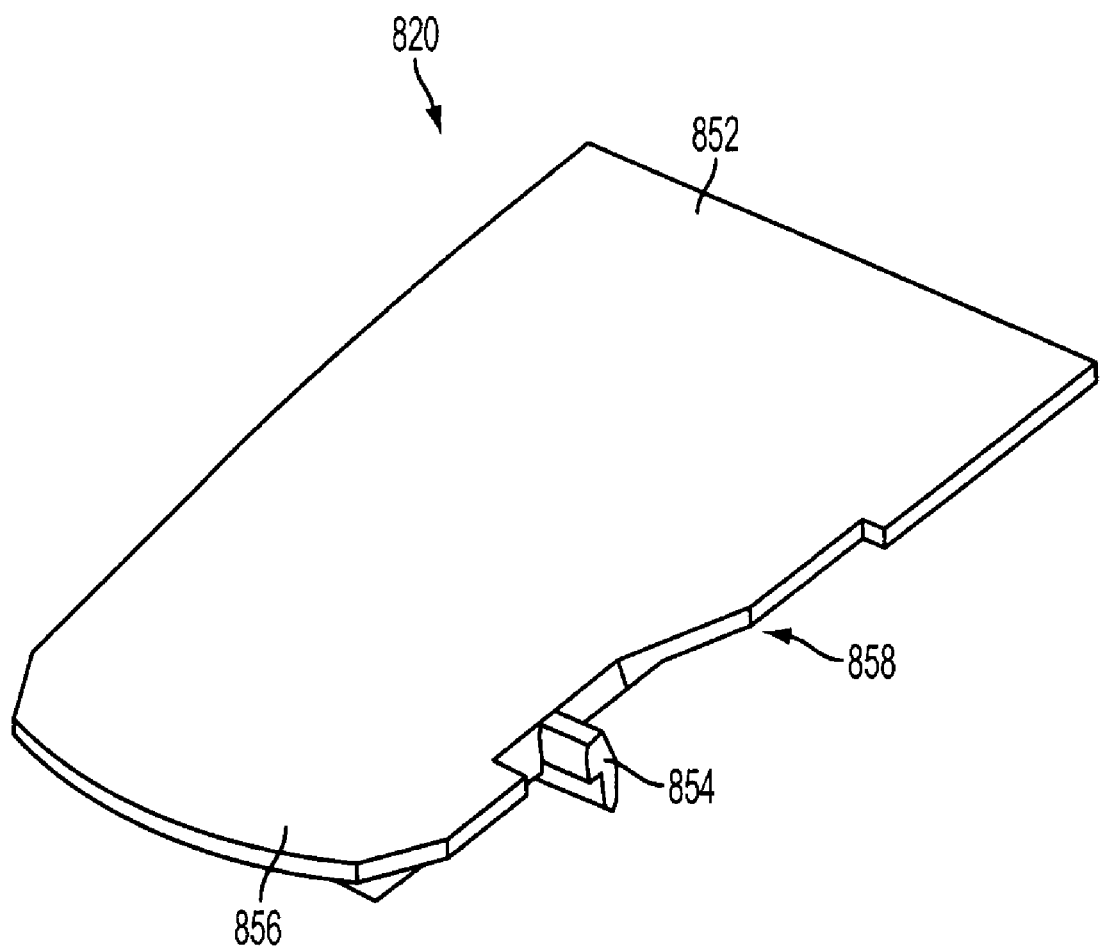
FIG. 18 depicts a top perspective view of the trigger plate in accordance with a preferred exemplary embodiment.
Figure 19:
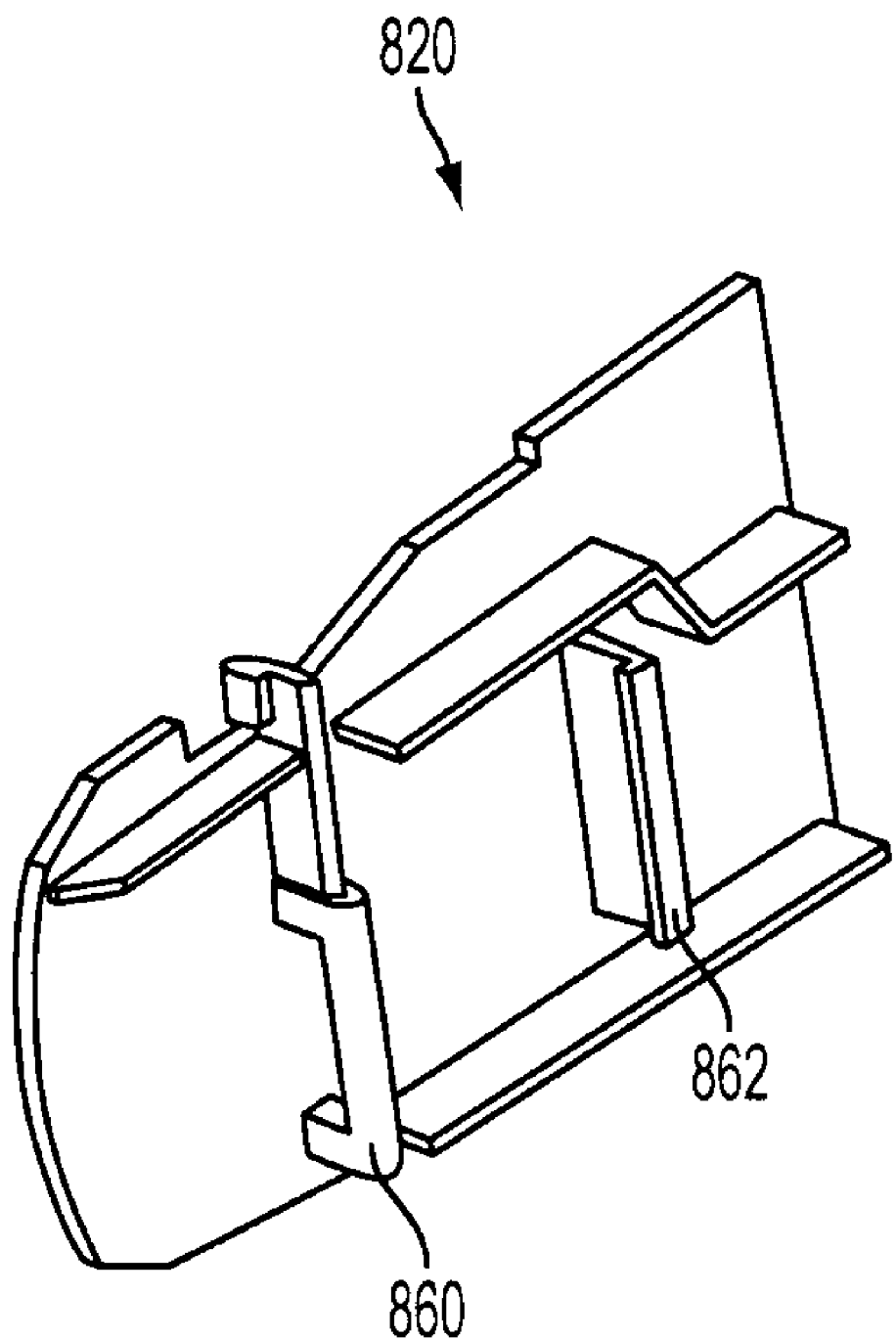
FIG. 19 depicts a bottom perspective view of the trigger plate in accordance with a preferred exemplary embodiment.

Referring to FIGS. 18 and 19, top and bottom perspective views of the trigger plate in accordance with preferred exemplary embodiments are illustrated. As shown, the trigger plate 820 may include a flat top surface for an animal to walk on. The trigger plate 820 may include a setting tab 854 which is adapted to engage a notch 872 (shown in FIG. 14) on the first side member 802. In a latched position, the setting tab 854 is received by the notch 872 and sets the trap 800 in the latched or set position. It is appreciated that other setting mechanisms may be used to set the trigger plate 820 in a set or latched position. To move the trigger plate 820 from an unlatched position to a latched position, the contact applicator 850 of the lever 848 may contact the contact area 856 of the trigger plate, e.g., a trigger plate contact area, and force the trigger plate 820 downward until the setting tab 854 engages the notch 872. The trigger plate 820 may have a cutout 858 corresponding to the shape of the lever 848. The trigger plate 820 may include a handle 860 adapted to interact with the plate platform 822 and to pivotally couple the trigger plate 820 and plate platform 820. For example, the handle 860 may form an opening capable of receiving a component, e.g., a tab 864, from the platform plate 822. The trigger plate 820 may include a catch 862, e.g., a trigger plate catch, adapted to interact with the plate platform 822 to limit the tilt or pivot of the trigger plate 820 with respect to the platform plate 822. It is appreciated that other coupling mechanisms may be used to pivotally couple the trigger plate 820 and the platform plate 822.

Figure 20:
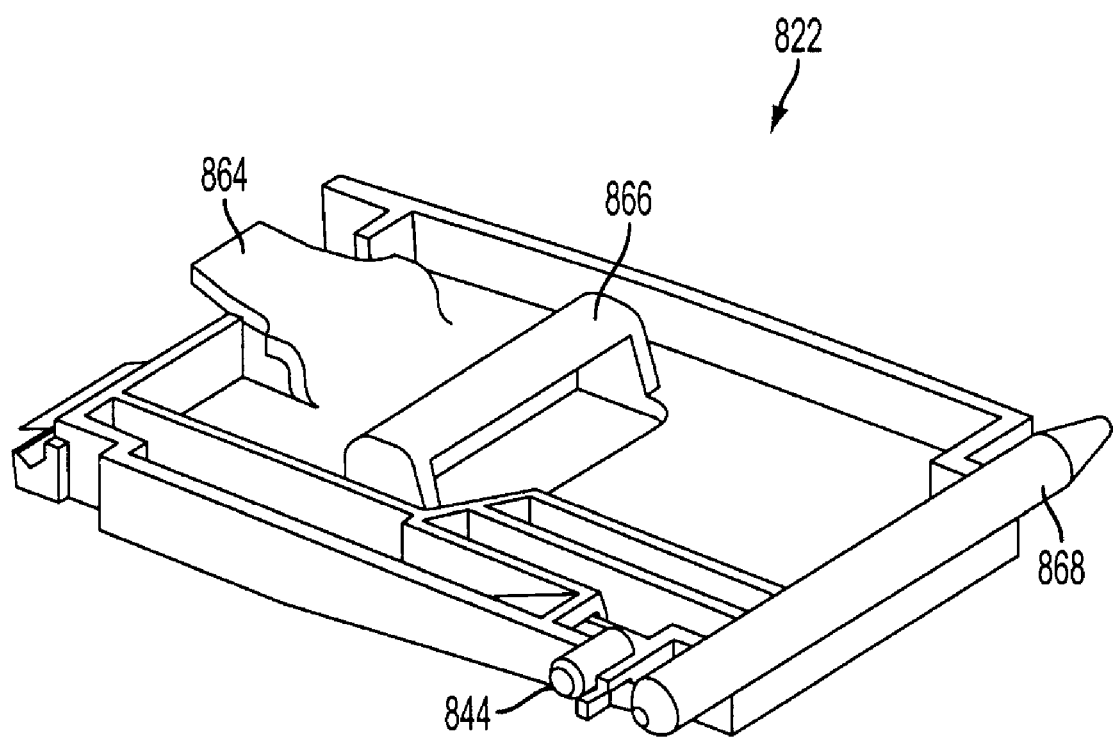
FIG. 20 depicts a top perspective view of the platform plate in accordance with a preferred exemplary embodiment.
Figure 21:
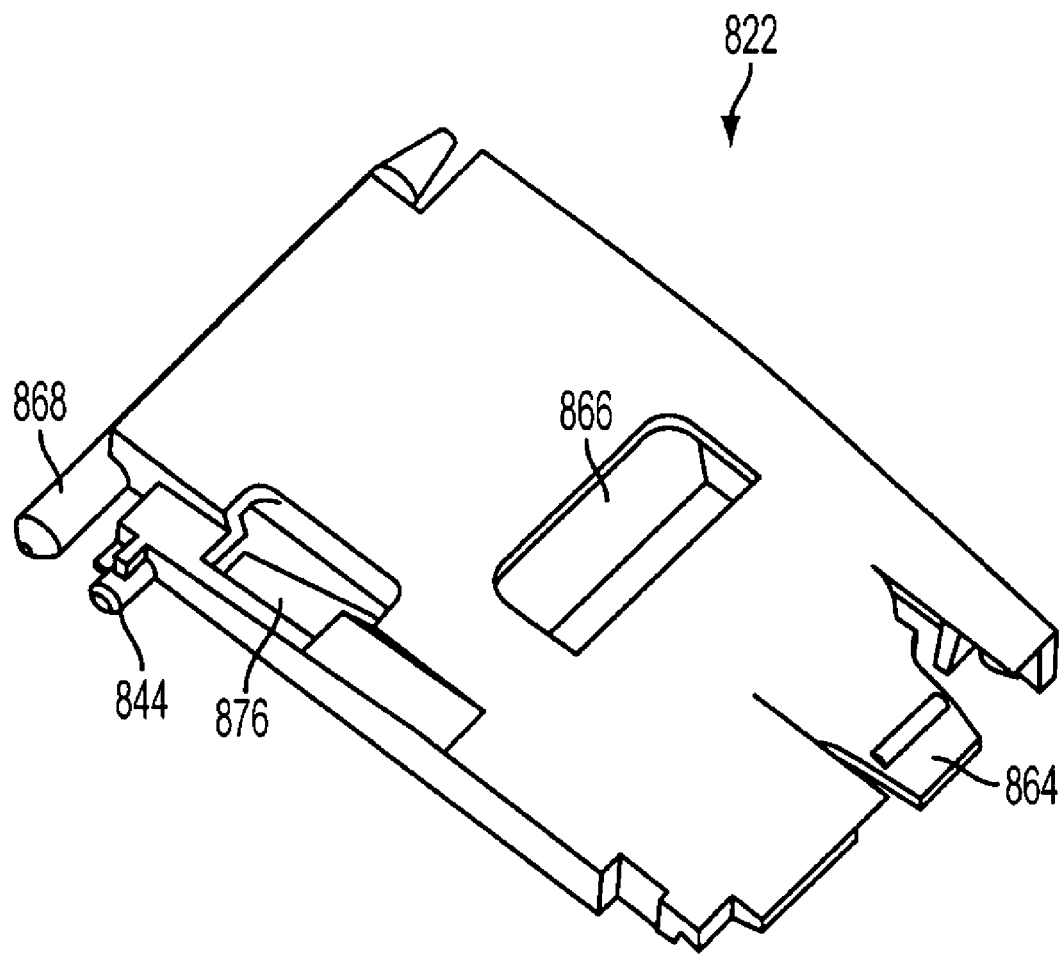
FIG. 21 depicts a bottom perspective view of the platform plate in accordance with a preferred exemplary embodiment.

Referring to FIGS. 20 and 21, top and bottom perspective views of the platform plate in accordance with preferred exemplary embodiments are illustrated. As shown, the platform plate 822 may include a tab 864, e.g., a coupling tab. The coupling tab 864 may be adapted to extend through the opening of the handle 860 of the trigger plate 820 and to pivotally couple the trigger plate 820 and the platform plate 822. It is appreciated that other pivotally coupling mechanisms may be used to couple the trigger plate 820 and the platform plate 822. For example, the platform plate 822 may include a handle and the trigger plate 820 may include a tab. The platform plate 822 may include a stop catch 866. The stop catch 866 may be adapted to interact with the catch 862 of the trigger plate 820 and to limit the tilt or pivot of the trigger plate 820 with respect to the platform plate 822. As shown in the figures, the catch 862 may be "L" shaped with a piece extending approximately parallel with the trigger plate and interacting with an opening of the stop catch 866 which is adapted to retain the catch 862 in an opening of the catch stop 866. It is appreciated that other interaction mechanisms may be used to limit the tilt of the trigger plate 820 with respect to the platform plate 822. For example, the platform plate 822 may include a stop catch and the trigger plate 820 may include a catch. The trigger plate 820 and platform plate 822 may include additional coupling mechanisms to pivotally couple the trigger plate 820 and the platform plate 822. The platform plate 822 may include an opening and a biasing element retention area 876. The opening may receive an extending end of a biasing element 874 (shown in FIG. 15) and the biasing element retention area 876 may retain the extending end of the biasing element 824 as discussed below.

The platform plate 822 may include a pivoting bar 868. The pivoting bar 868 may have a first end and a second end with the first end adapted to engage with the first side member 802 and the second end adapted to engage with the second side member 804. As shown, the first end or second end may be conical shape to assist the pivoting bar in engaging with the side members 802, 804. Each of the side members 802, 804, may include pivoting recess for receiving the first or second end of the pivoting bar 868. For example, the pivoting projection 842 of the first side member 802 may include a recess to receive the first end or second end of the pivoting bar 868 as shown in FIG. 15. The second side member 804 may include a recess to receive the other end of the pivoting bar 868. It is appreciated that other pivoting mechanisms may be used to pivotally couple the platform plate 822 with the housing 102. For example, the first and second side members 802, 804, may include projections adapted to be received by recesses in the platform plate 822. The platform plate 822 may include a coupling projection 844. The coupling projection 844 may be adapted to couple the platform plate 822 with the coupling recess 832 of the set arm 812. By coupling the platform plate 822 to the set arm 812, the platform plate 822 and trigger plate 820 may move in conjunction with the set arm 812, e.g., from an unlatched position to a latched position. It is appreciated that other coupling mechanisms may be used to couple the platform plate 822 with the set arm 812. For example, the set arm 812 may include a coupling projection and the platform plate 822 may include a coupling recess.

A biasing element 874, e.g., a spring such as a single coil spring, may be interposed between a first or second end of the pivoting bar 868. Specifically, the pivoting bar 868 may extend through a hole formed by the coiled spring to couple the biasing element 874 and the pivoting bar 868. The biasing element 874 may include a first extending end that is retained by the biasing element retention area 876 of the platform plate 822 and a second extending end that is retained against the bottom 106 of the trap 800. The biasing element 874 may bias the platform plate 822 (and the coupled trigger plate 820) towards the back wall 112 of the trap 800.

Figure 22:
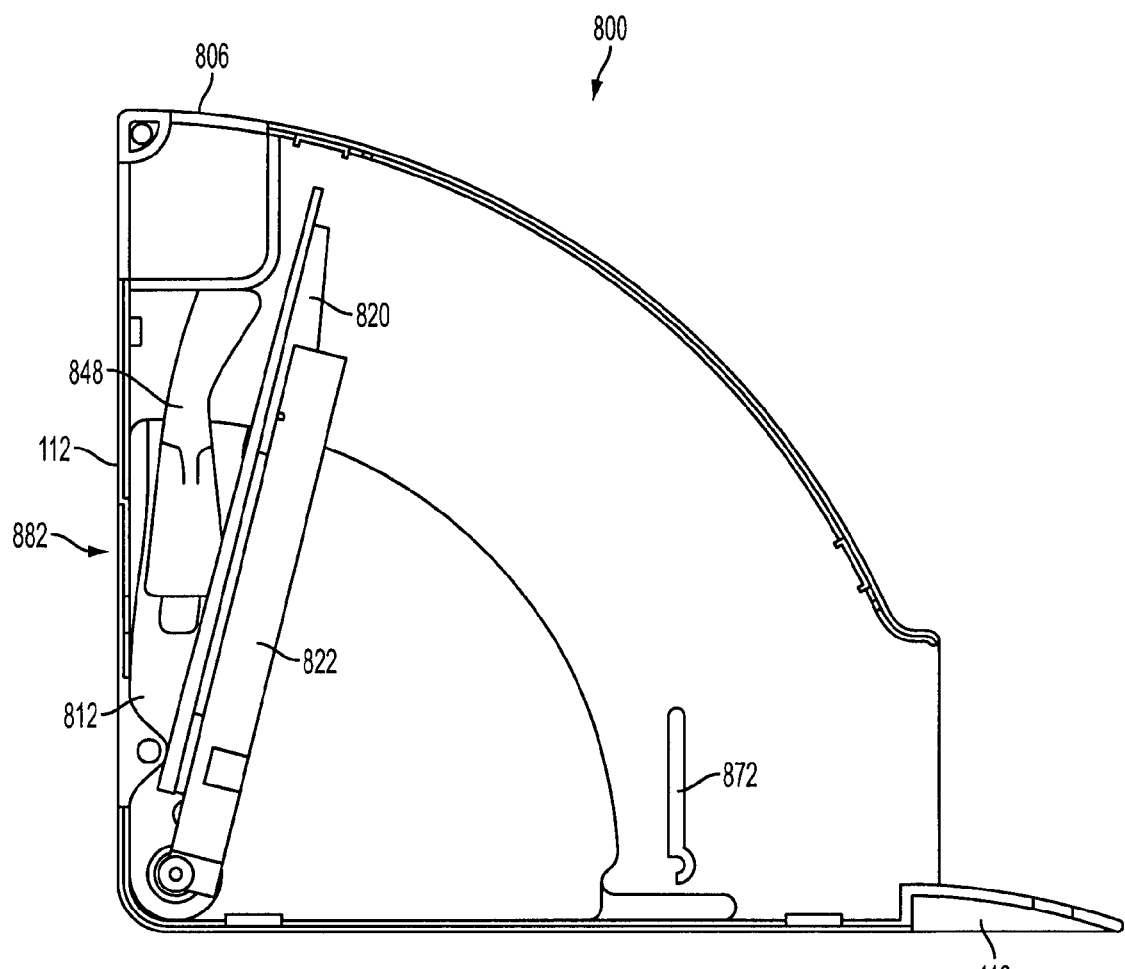
FIG. 22 depicts a side view of the trap, without a sidewall, in the unlatched position in accordance with a preferred exemplary embodiment.

Referring to FIG. 22, a side view of the trap, without a sidewall, in the unlatched position in accordance with a preferred embodiment is illustrated. As shown, the trigger platform 820 may be above and coupled to the platform plate 822. The coupling projection 844 of the platform plate 822 may couple the platform plate 822 to the set arm 812. The set arm 812 and the platform plate 822 may be pivotally coupled to the housing 812 via the pivoting recess 830 of the set arm 812 and the pivoting bar 868 interacting with the pivoting projection 842 of the first side member 802. The lever 848 may be coupled to the set arm 812 via the coupling projections 844 on the lever 848 and corresponding slots 834 on the set arm 812.

By moving the set arm 812, the set arm 812, the lever 848, the trigger plate 820, and the platform plate 822 may move from a substantially vertical position, e.g. an unlatched position, towards the bottom 106 of the trap 800. As discussed below, the trigger plate 820 and other components move downward with the setting tab 858 of the trigger plate 820 engaging a notch 872 in the first side member 802. The notch 872 may include a straight section with a "c" shaped section on or near the bottom of the straight section. The "c" shaped section may be adapted to receive the setting tab 854 of the trigger plate 820 and to set the trap 800 in the set or latched position. It is appreciated that other setting mechanisms may be used to set the trap 800.

Figure 23:
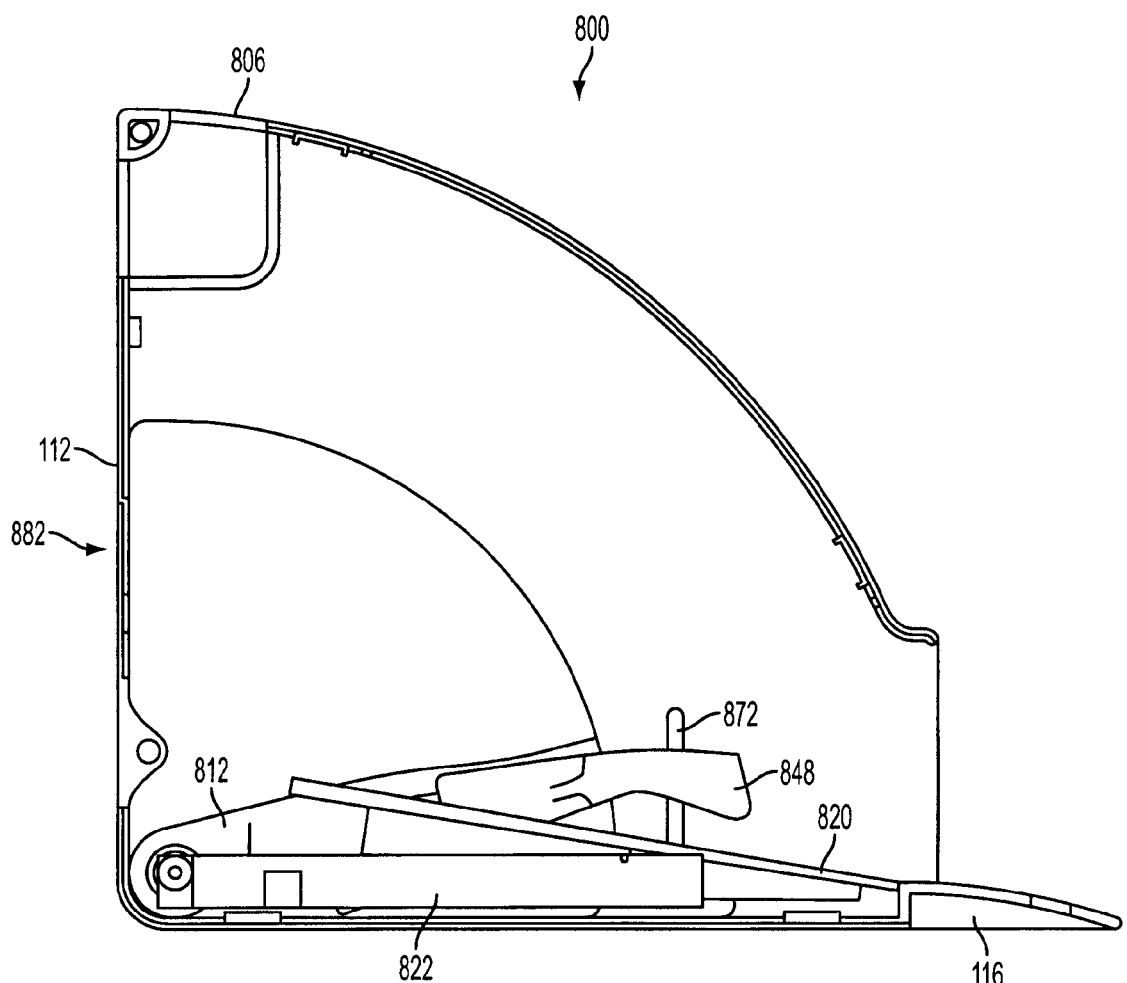
FIG. 23 depicts a side view of the trap, without a sidewall, in the latched position in accordance with a preferred exemplary embodiment.

Referring to FIG. 23, a side view of the trap, without a sidewall, in the latched position in accordance with a preferred embodiment is illustrated. As shown, the trigger platform 820 may be coupled to and tilted with respect to the platform plate 822. In such a position, the trap 800 is set or is in a latched position To reach the set position, the set arm 812 is press downward towards the bottom 106 of the trap 800. During this process, the contact applicator 850 of the lever 848 may contact the contact area 856 of the trigger plate 820 forcing the trigger plate 820 and platform plate 822 to move towards the bottom 106 of the trap 800. At some point during this process, the setting tab 854 of the trigger platform 820 may contact and engage with the notch 872 of the first side member 802 (shown in FIGS. 14 and 22). Once the platform plate 822 contacts the bottom 106 of the trap 800, force may still be applied to the pressing area 836 of the set arm 812, thereby compressing the integrated spring 838 of the set arm 812 and causing the contact applicator 850 to press down on the contact area 856 of the trigger plate 820 causing the trigger plate 820 to rotate or tilt with respect to the platform plate 822 and for the setting tab 854 to engage with the "c" section of the notch 872. With the platform plate 822 in the tilted position and the setting tab 854 retaining the platform plate 822 in such a position, the trap 800 is set or in the latched position. In the set position, the setting tab 855 prevents the biasing element 874 from causing the platform plate 822 (and coupled trigger plate 820) to pivot towards the back wall 112 of the trap 800. When pressure is released from the set arm 812, the integrated spring 838 may allow the set arm 812 to recover upwards to a nominal position. This action may carry the lever 848 with it and may hold the lever 848 at a distance above the trigger plate 820 such that the lever 848 does not interfere or restrain the trigger plate 820 rotating on its pivot as the setting tab is released by the action or weight of the animal. In this manner neither the set arm 812 nor the lever 848, which are needed to set the trap, offer no resistance to the trap being triggered by the animal after the pressure is released from the set arm 812 during setting the trap 800.

Figure 30:
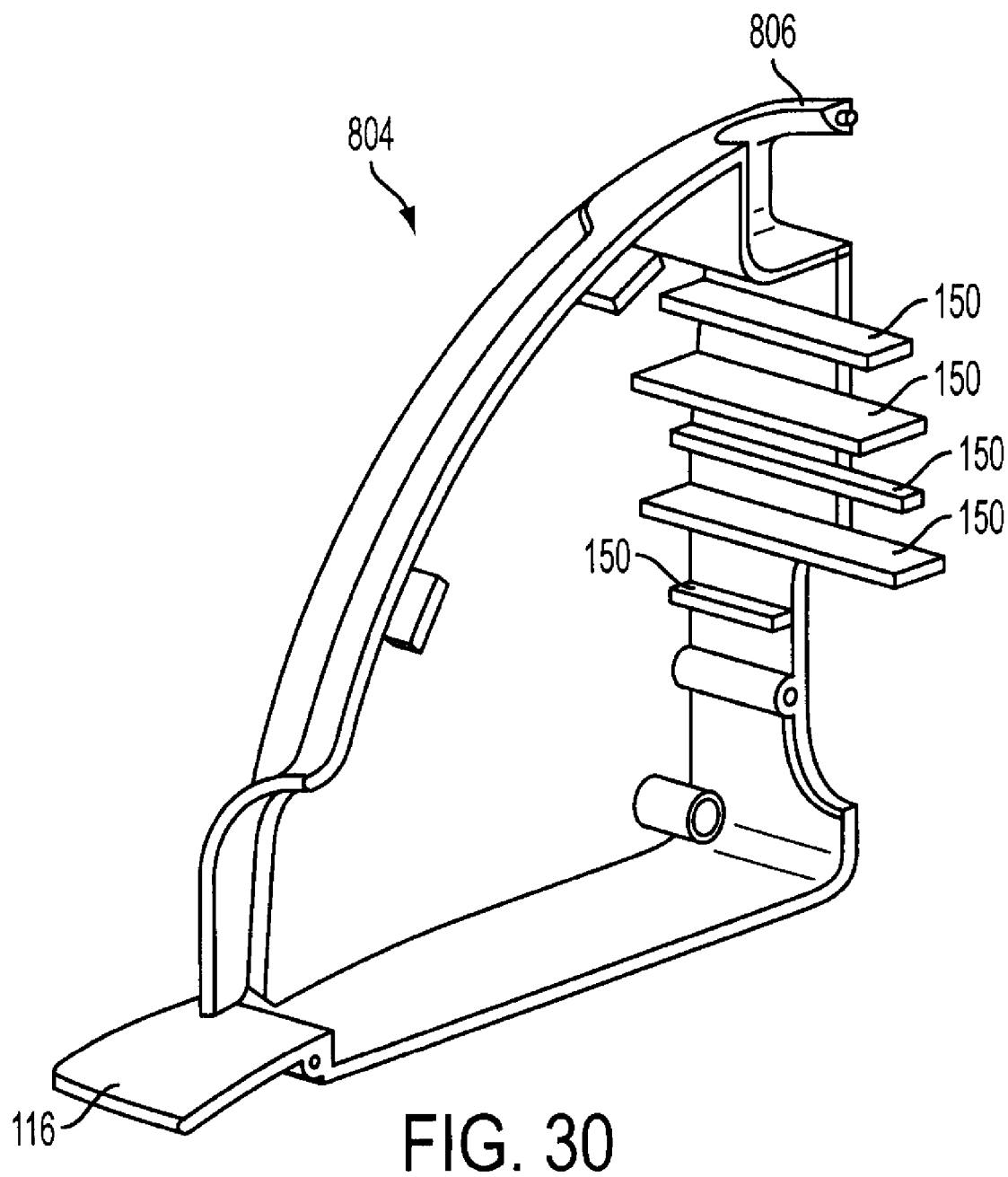
FIG. 30 depicts a side view of the trap without a sidewall in accordance with a preferred exemplary embodiment.

When the trap 800 is in a set or latched position and an animal, e.g., a mouse, puts weight on the trigger plate 820 the mouse triggers the trap 800. When the trap 800 is triggered, the trigger plate 820 tilts or rotates towards a level position, e.g., becomes substantially parallel with platform plate 822, the setting tab 854 disengages from the notch 872, and the biasing element 874 biases the platform plate 822 (and coupled trigger plate 820) to pivot towards the back wall 112 of the trap 800. As a result, the animal, e.g., mouse, may be trapped between the trigger plate 820 and the back wall 112. If the housing 102 includes the one or more blunt fingers 150 as described above with reference to trap 100 and also shown in FIGS. 15 and 30, the animal, e.g., mouse, may be trapped between the trigger plate 820 and the one or more blunt fingers 150. As shown in FIG. 30, the one or more blunt fingers 150 may have different widths, e.g., the distance from the back wall that each blunt finger extends towards the entrance 112.

Figure 27:
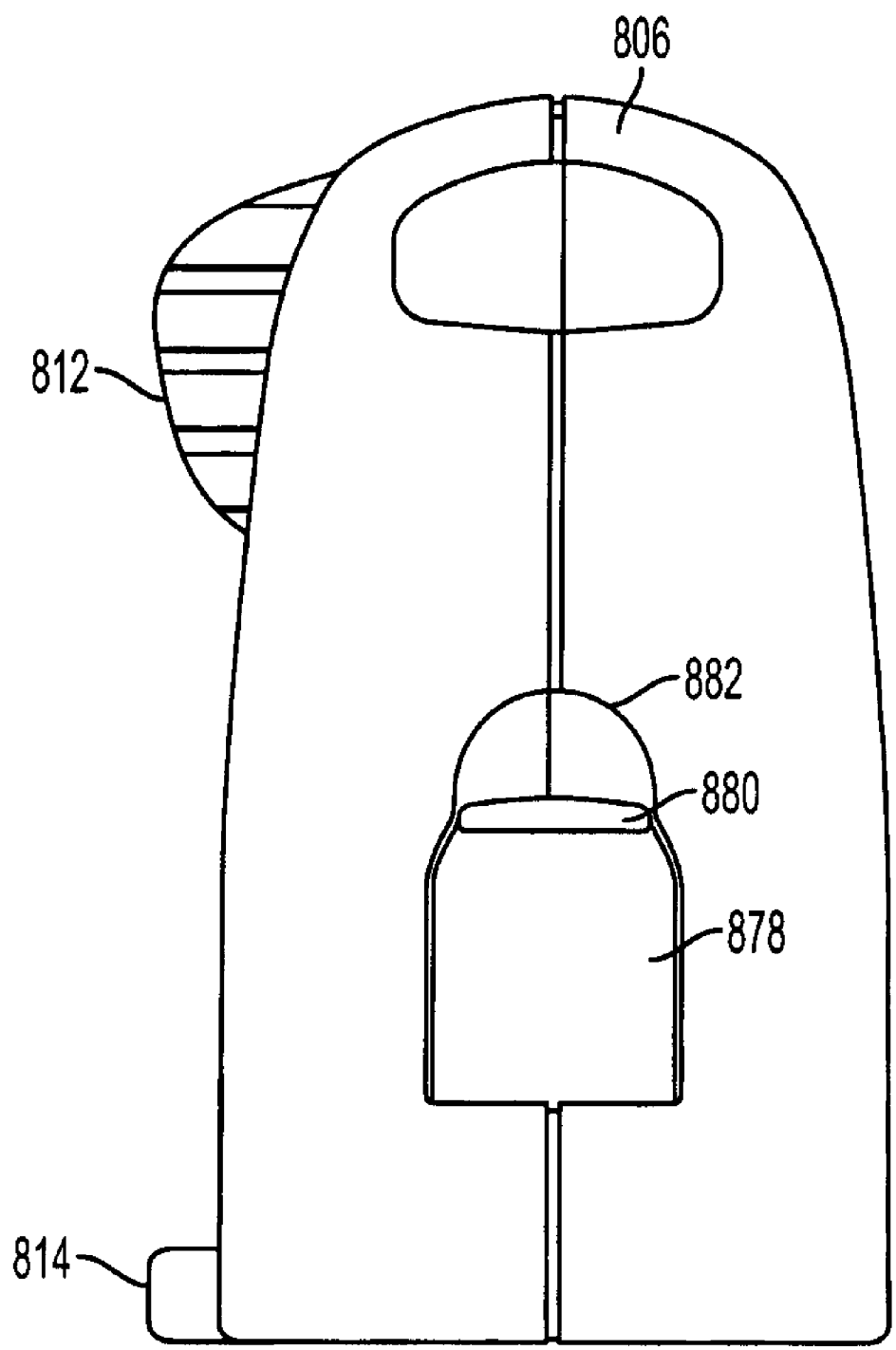
FIG. 27 depicts a back view of the trap in the latched position in accordance with a preferred exemplary embodiment.
Figure 28:
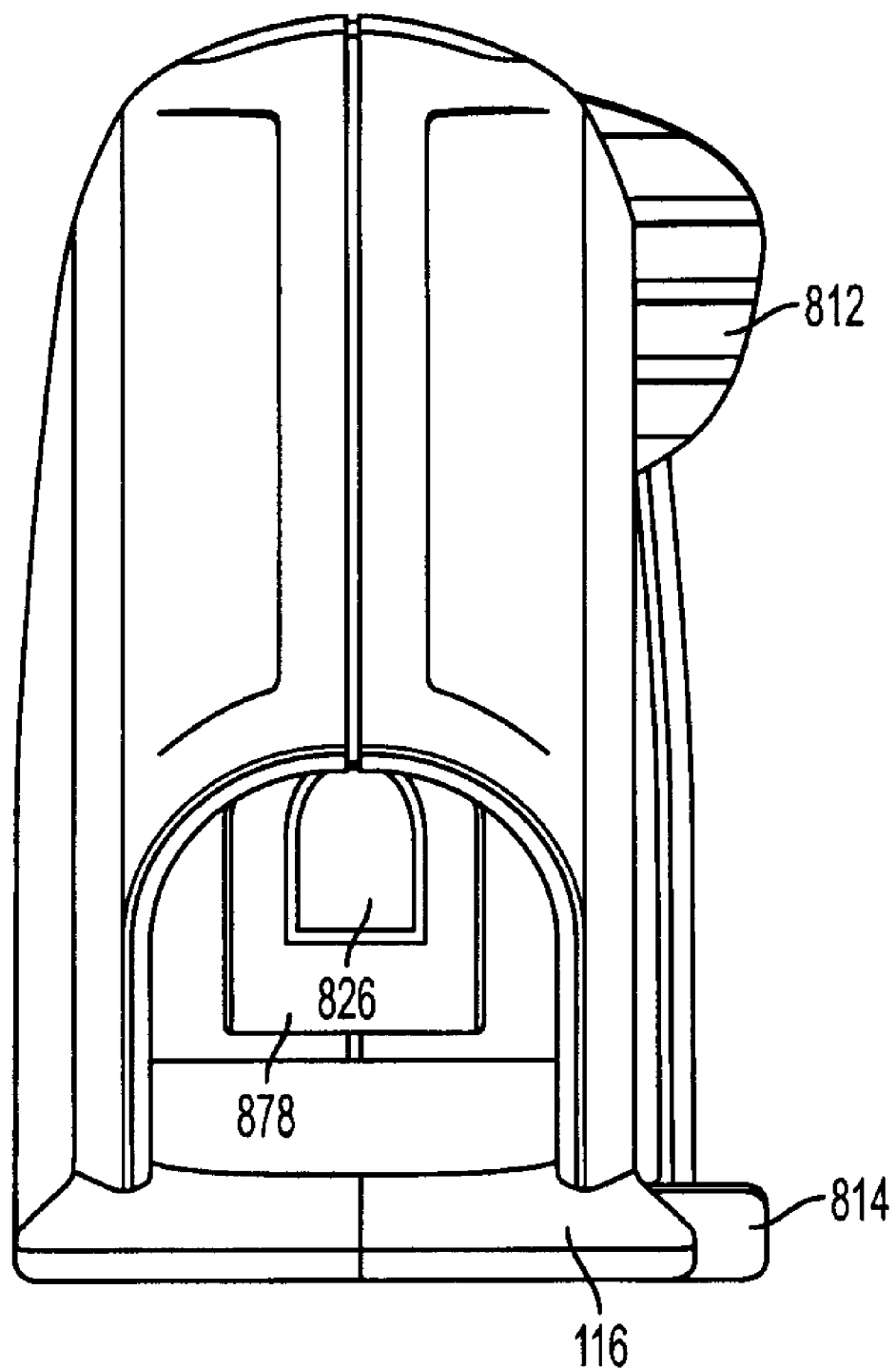
FIG. 28 depicts a front view of the trap in an unlatched position in accordance with a preferred exemplary embodiment.
Figure 29:
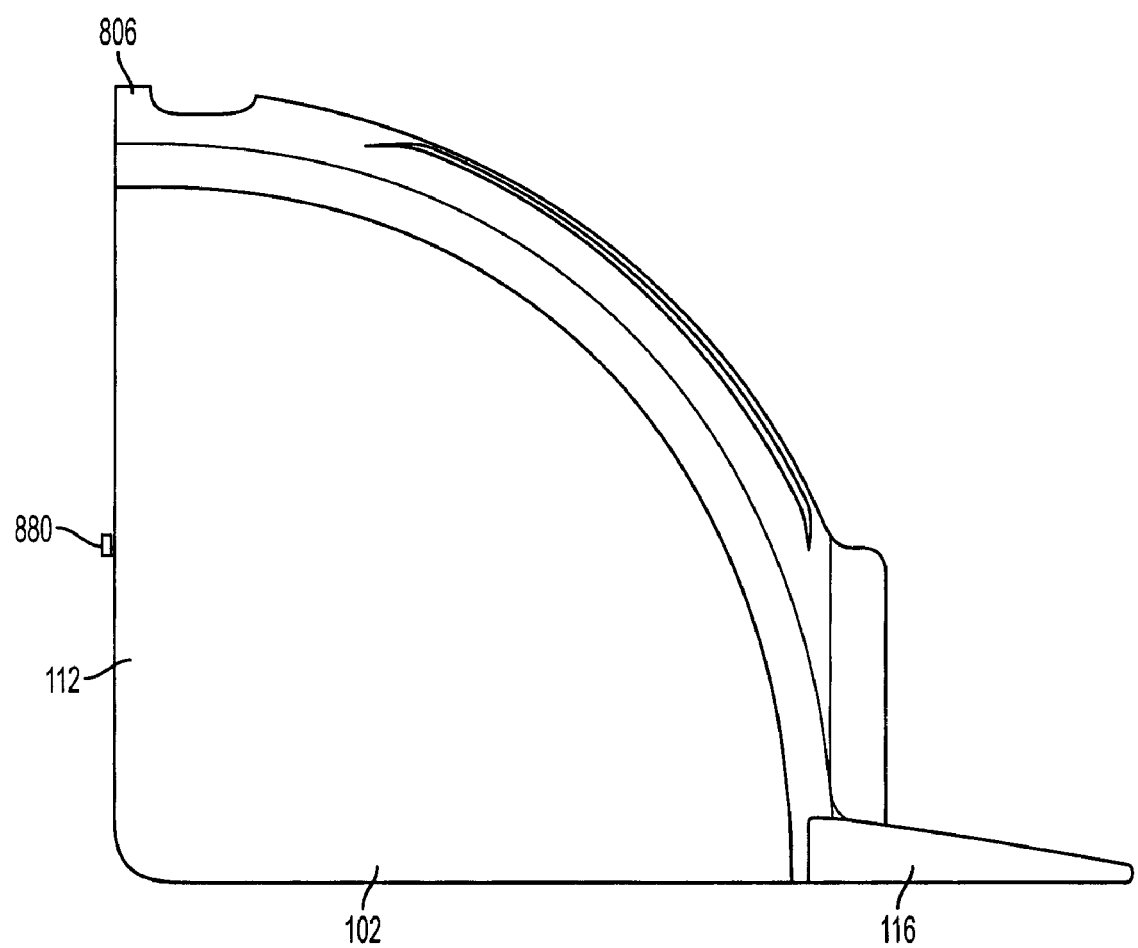
FIG. 29 depicts a second side view of the trap in accordance with a preferred exemplary embodiment.

Referring to FIGS. 27-29, perspective views of an attractant reservoir in accordance with a preferred embodiment are illustrated. As shown, the trap 800 may include an attractant reservoir 826. The attractant reservoir 826 may be adapted to hold an attractant (not shown). The attractant may be a scent, a rodenticide, and/or bait to attract an animal inside the trap 800. The attractant reservoir 826 may include a reservoir door 878 pivotally coupled to the back wall 112 of the trap 800. As shown in FIG. 15, the attractant reservoir 826 may include pivoting pins and each side member 802, 804 may include pin recesses adapted to receive the pivoting pins. To open the reservoir door 878, the back wall 112 may include an indentation 882 adapted to allow a user to place a finger in the indentation 882 and press down on an edge 880 of the reservoir door 878. The reservoir door 878 may allow access to the attractant reservoir 826 to allow an attractant, e.g., peanut butter or cheese, to be placed in the attractant reservoir 826 to assist in attracting an animal, such as a mouse, to the trap 800.

In preferred embodiments, the traps are configured for a single use. Accordingly, it is preferred that the trap and its members or components are made of a relatively inexpensive material, such as a thin-walled rigid polymeric material that may be injection molded in to the desired shapes. For example, the housing 102 may preferably be made of a polymeric material, such as rigid styrene polymers and co-polymers. Other suitable materials include acrylonitrile-butadiene-styrene (ABS), or polyvinyl-chloride (PVC). It is appreciated that other suitable polymeric materials, and/or suitable non-polymeric materials, may be selected for the construction of the trap or its component parts.

In certain exemplary embodiments, each of the component described herein are injection molded to a desired shape. In some exemplary embodiments, each component may be molded as a single, unitary molded part. In other exemplary embodiments, the component may be molded in multiple parts that are joined or attached together to form the component. The various means for designing molds, and joining various parts to form one component will be understood by one familiar with such processes and parts.

Although various embodiments of the traps are illustrated, the traps are not limited to the disclosed embodiments. For example, a trap may include different triggers and/or platforms. In such embodiments, the animal may position itself on a platform or trigger plate and triggers the trap. When triggered, a biasing element causes the platform or trigger plate to pivot towards the back wall of the trap thereby trapping the animal between the platform or trigger plate and back wall (or blunt fingers).

In the preceding specification, various embodiments have been described with reference to the accompanying drawings. It will, however, be evident that various modifications and changes may be made thereto, and additional embodiments may be implemented, without departing from the broader scope of the exemplary embodiments as set forth in the claims that follow. The specification and drawings are accordingly to be regarded in an illustrative rather than restrictive sense.

The invention claimed is:

1. A trap comprising:
  a housing having an entrance, a first wall, and a base extending therebetween, the housing further comprising a notch; and
  a trigger plate pivotally coupled to the housing adjacent a juncture of the base and the first wall of the housing, and comprising a setting tab which engages the notch to set the trigger plate in a set position whereby the trigger plate resides above the base of the housing, wherein the trigger plate, when triggered by a rodent, pivots towards the first wall of the housing, thereby moving the rodent toward the first wall of the housing and trapping the rodent between the trigger plate and the first wall of the housing.

2. The trap of claim 1 further comprising a biasing element biasing the trigger plate towards the first wall of the housing.

3. The trap of claim 2 wherein the biasing element is a spring.

4. The trap of claim 1 further comprising a set arm coupled to the trigger plate and extending outside the housing, the set arm is moveable to assist in moving the trigger plate to the set position.

5. The trap of claim 4 further comprising a lever coupled to the set arm and configured to contact the trigger plate when the set arm is actuated and forces the trigger plate to the set position.

6. The trap of claim 5 wherein the set arm further comprises an integrated spring, wherein when the set arm is acted upon, the integrated spring is compressed and the setting tab engages the notch thereby setting the trigger plate in the set position.

7. The trap of claim 1 wherein the trigger plate pivots towards the first wall of the housing when weight is placed on the trigger plate causing the setting tab to disengage from the notch.

8. The trap of claim 1 further comprising a platform plate pivotally coupled to the housing adjacent the juncture of the base and the first wall of the housing and the trigger plate pivotally coupled to the platform plate.

9. The trap of claim 1 further comprising at least one blunt finger coupled to the first wall of the housing so that when the trigger plate is triggered by the rodent, the trigger plate pivots toward the first wall of the housing and contacts and traps the rodent against the at least one blunt finger and the trigger plate.

10. The trap of claim 1 wherein the housing further comprises a finger grip spanning across an opening in the housing.

11. The trap of claim 1 further comprising an attractant reservoir pivotally coupled to the housing.

12. A trap comprising:
a housing having an entrance, a first wall, and a base extending therebetween, said entrance providing a passageway into the housing; and
a trigger plate pivotally coupled to the housing adjacent a juncture of the base and the first wall of the housing, the trigger plate having a latched position in which the platform is adjacent to the base and the entrance and a triggered position in which the platform is pivotally biased towards the first wall;
wherein the trigger plate, when triggered by a rodent, pivots towards the triggered position, thereby moving the rodent toward the first wall of the housing and trapping the rodent between the trigger plate and the first wall of the housing.

13. The trap of claim 12 further comprising a biasing element coupled to the trigger plate and pivotally biasing the trigger plate towards the first wall.

14. The trap of claim 13 wherein the biasing element is a spring.

15. The trap of claim 12 further comprising a set arm coupled to the trigger plate and extending outside the housing, the set arm is moveable to assist in moving the trigger plate from the triggered position to the latched position.

16. The trap of claim 12 wherein the trigger plate further comprises a setting tab adapted to engage a notch in a side wall of the housing when the trigger plate is in the latched position and adapted to disengage from the notch when the trigger plate is triggered.

17. The trap of claim 16 wherein the trigger plate pivots towards the housing when weight is placed on the trigger plate causing the setting tab to disengage from the notch.

18. The trap of claim 12 further comprising a platform plate pivotally coupled to the housing at a juncture of the base and the first wall of the housing and the trigger plate is pivotally coupled to the platform plate.

19. The trap of claim 12 further comprising at least one blunt finger coupled to the first wall of the housing so that when the trigger plate is triggered by the rodent, the trigger plate pivots toward the triggered position and contacts and traps the rodent against the at least one blunt finger.

20. The trap of claim 12 wherein the housing further comprises a finger grip spanning across an opening in the housing.

21. The trap of claim 12 further comprising an attractant reservoir pivotally coupled to the housing.

22. A trap comprising:
a housing having a top, a bottom, a first side wall, a second side wall, a back wall, and an entrance providing a passageway into the housing;
at least one numbing finger coupled to the housing with each numbing finger extending laterally towards the entrance;
a platform plate pivotally coupled to the housing adjacent a juncture of the bottom and the back wall and having a set position in which the platform resides above the bottom of the housing and extends toward the entrance;
a trigger plate pivotally coupled to the platform plate and having a set position in which the trigger plate is positioned above the platform plate and adjacent to the entrance; and
a biasing element pivotally biasing the trigger plate and platform plate to a triggered position in which the platform is biased towards the back wall,
wherein when triggered by a rodent, the trigger plate and platform plate pivot from the set position to the triggered position under the bias of the biasing element, and at least one of the trigger plate and the platform thereby moves the rodent toward the back wall of the housing and traps the rodent against the at least one numbing finger.

* * * * *